United States Patent [19]
Tanaka et al.

[11] 3,909,513
[45] Sept. 30, 1975

[54] FACSIMILE SYSTEM

[75] Inventors: Yutaka Tanaka; Sumio Ogawara, both of Tokyo, Japan

[73] Assignees: Matsushita Electric Industrial Co., Ltd., Osaka; Matsushita Graphic Communication Systems, Inc., Tokyo, both of Japan

[22] Filed: Oct. 17, 1972

[21] Appl. No.: 298,248

[30] Foreign Application Priority Data

Oct. 18, 1971 Japan ............................... 46-82590
Nov. 24, 1971 Japan ............................... 46-94793

[52] U.S. Cl. ............. 178/6; 178/DIG. 3; 179/15.55
[51] Int. Cl. ............................................ H04n 1/02
[58] Field of Search ............. 178/DIG. 3; 179/15.55

[56] References Cited

UNITED STATES PATENTS

| | | | |
|---|---|---|---|
| 2,342,943 | 2/1944 | Kell | 332/17 |
| 3,347,981 | 10/1967 | Kagan et al. | 178/DIG. 3 |
| 3,472,953 | 10/1969 | Montevecchio | 179/15.55 |
| 3,632,867 | 1/1972 | Markow | 178/DIG. 3 |
| 3,643,016 | 2/1972 | Dattilo | 178/DIG. 3 |
| 3,730,988 | 7/1970 | Shimizu | 178/DIG. 3 |

*Primary Examiner*—Robert L. Griffin
*Assistant Examiner*—Marc E. Bookbinder
*Attorney, Agent, or Firm*—Stevens, Davis, Miller & Mosher

[57] ABSTRACT

A facsimile system involving bandwidth compression is disclosed. On the transmission side, the scan zone of the original is divided into a plurality of divisions, and the picture signal for each division is frequency converted with a predetermined frequency conversion factor corresponding to the quality of information contained in that division. The frequency converted picture signal is transmitted together with a synchronization control signal, which indicates the position and frequency conversion factor of the picture signal. On the reception side, the received picture signal is oppositely frequency converted for individual divisions on the basis of the corresponding synchronization control signal also received. The picture signal thus reproduced is displayed or coupled to a recorder for recording.

8 Claims, 29 Drawing Figures

FACSIMILE SYSTEM

The present invention relates to facsimile systems and methods of transmitting a facsimile signal, in which a facsimile signal obtained by scanning an original with an electron tube, image-pick-up tube, high-speed mechanical scanner, etc., is transmitted through bandwidth compression for processing to obtain facsimile reproduction of the original.

More particularly, the invention concerns facsimile systems and methods of transmitting a facsimile signal, in which the scan zone of the original is divided into a plurality of divisions to vary the transmission speed for each division according to the quality of information in each division, and whose reception side processes the facsimile signal thus transmitted to obtain facsimile reproduction of the original.

Prior-art methods for bandwidth compression of the facsimile signal obtainable by the variable speed scanning system include one, in which the main scanning is temporarily stopped or slowed down at a level change point of a detection signal obtainable from a photoelectric conversion element or the like. In another method, each scan line is divided into a plurality of divisions, and the actual scanning speed is determined after the preliminarily high-speed scanning of the individual divisions.

In the former method, only the points of level change of the detection signal from white level to black level or from black level to white level are transmitted so as to improve the transmission efficiency. In this type of digital variable speed scanning, however, there are inherent problems in the control of deflection circuits of the electron tube and the like and in the method of transmission of the output signal. Since the electron tube or the like used for the facsimile scanning usually utilizes electromagnetic deflection, it is difficult to interrupt the main scanning immediately when the level change point is detected. This is because even if the input voltage to the deflection circuit is held at the value at the instant of detection of the level change point, due to a lag of the deflection yoke current phase the scanning spot overscans considerably beyond the level change point before it comes to a halt. Therefore, the scanning spot should be returned to the position right adjacent the level change point to resume the scanning at a reduced speed. From this basis, the control of the deflection circuit is very complicated. Also, at the time of reducing the scanning speed it is necessary to project the tube by reducing the intensity of the spot, and also it is necessary to provide a blanking signal so as to prevent the detection of signal. This means that the relevant circuit construction is that much more complicated.

In the latter method, considering the difficulty of interrupting the main scanning mentioned above in connection with the former method, the control of exactly switching the scanning speed for each division is very difficult. Therefore, the control circuit is inevitably complicated.

An object of the invention is to improve the efficiency of facsimile transmission or similar transmissions.

Another object of the invention is to improve the efficiency of facsimile transmission through bandwidth compression of the facsimile signal.

A further object of the invention is to increase the speed of facsimile transmission with the same band.

A still further object of the invention is to provide for reliable and efficient facsimile transmission less subject to errors.

A still further object of the invention is to provide for readily controllable and efficient fascimile transmission with a circuit of relatively simple construction.

Yet another object of the invention is to enhance the efficiency of facsimile transmission by dividing the scan zone of the original into a plurality of divisions and changing the transmission speed according to the quality of information contained in each division.

A yet further object of the invention is to restrict the errors in facsimile transmission by dividing the scan zone of the original into a plurality of divisions and taking the synchronization between the transmission and reception sides for each division.

Another object of the invention is to transmit and receive reliably a synchronization control signal obtained by dividing the scan zone of the original into a plurality of divisions and by discriminating the quality of information contained in each division.

Another object of the invention is to eliminate waste time involved in the facsimile scanning by dividing the scan zone of the original into a plurality of divisions, memorizing the picture signal obtained through a constant high-speed scanning for each division and reading out the memorized picture signal for each division through frequency conversion with a predetermined frequency conversion factor corresponding to the quality of information contained in that each division.

Another object of the invention is to enable transmission of a synchronization control signal, which is obtained on the basis of dividing the scan zone of the original into a plurality of divisions and by discriminating the quality of information contained in each division, independently of and without directly affecting the transmission of the picture signal.

To achieve the above objects, according to the invention there is provided a facsimile system comprising a transmission side system and a reception side system, the transmission side system including means to obtain picture signal through constant high-speed scanning of an original, whose scan zone is divided into a plurality of divisions, means to temporarily memorize the picture signal thus obtained, means to read out the memorized picture signal under the control of a detection signal obtained by discriminating the quality of picture information contained in each division, means to produce a synchronization control signal indicating the position and frequency conversion factor of the picture signal from the detection signal, and means to transmit the read-out picture signal together with the synchronization control signal, the reception side system including means to detect the transmitted synchronization control signal, means to effect opposite frequency conversion of the above detected picture signal for each division on the basis of the detection of the synchronization control signal, and means to couple the signal obtained through the opposite frequency conversion to a recorder for the facsimile reproduction of the original.

The above and other objects, features and advantages of the invention will become more apparent from the following description, when read in connection with the accompanying drawings, in which.

Figure 1:
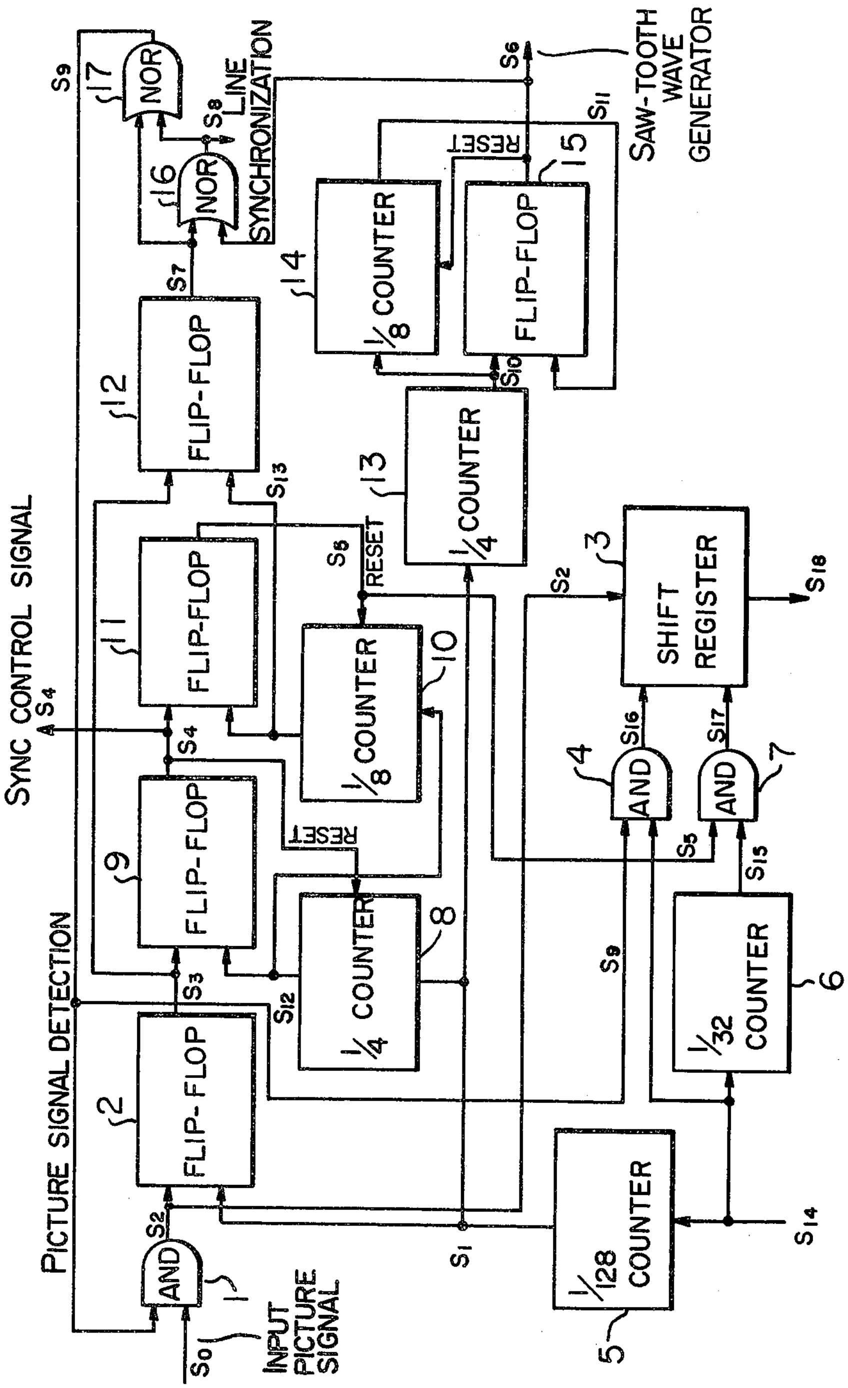
FIG. 1 is a block diagram showing the transmission side system of a first embodiment of the invention.
Figure 3A:
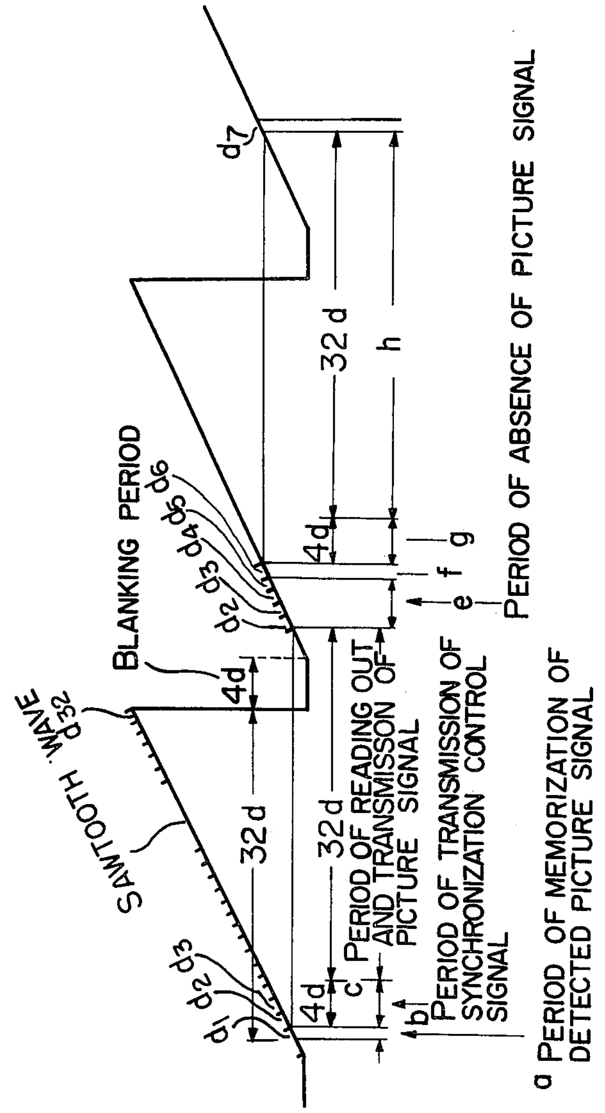
Figure 3B:
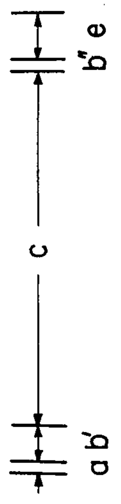
Figure 4A:
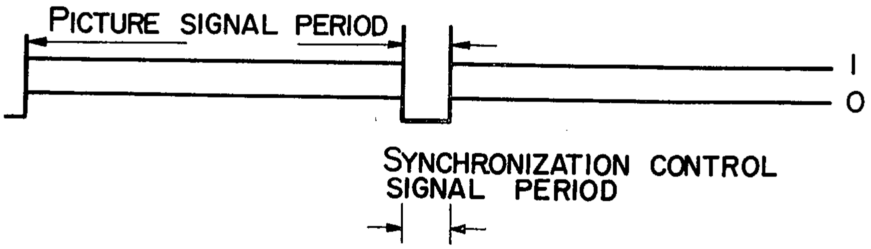
Figure 4B:
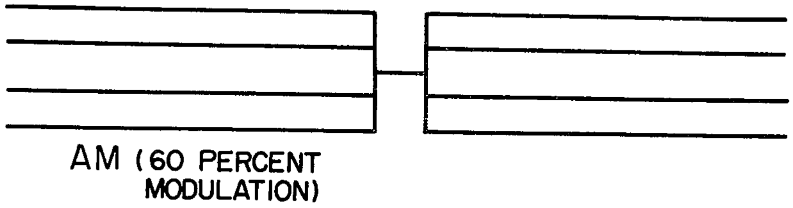
Figure 4C:
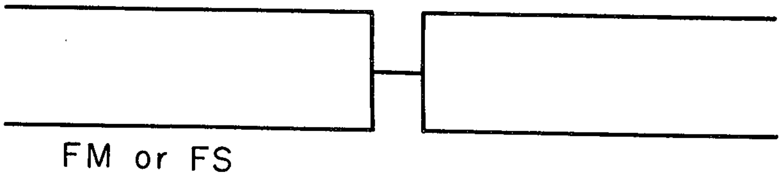
Figure 5:
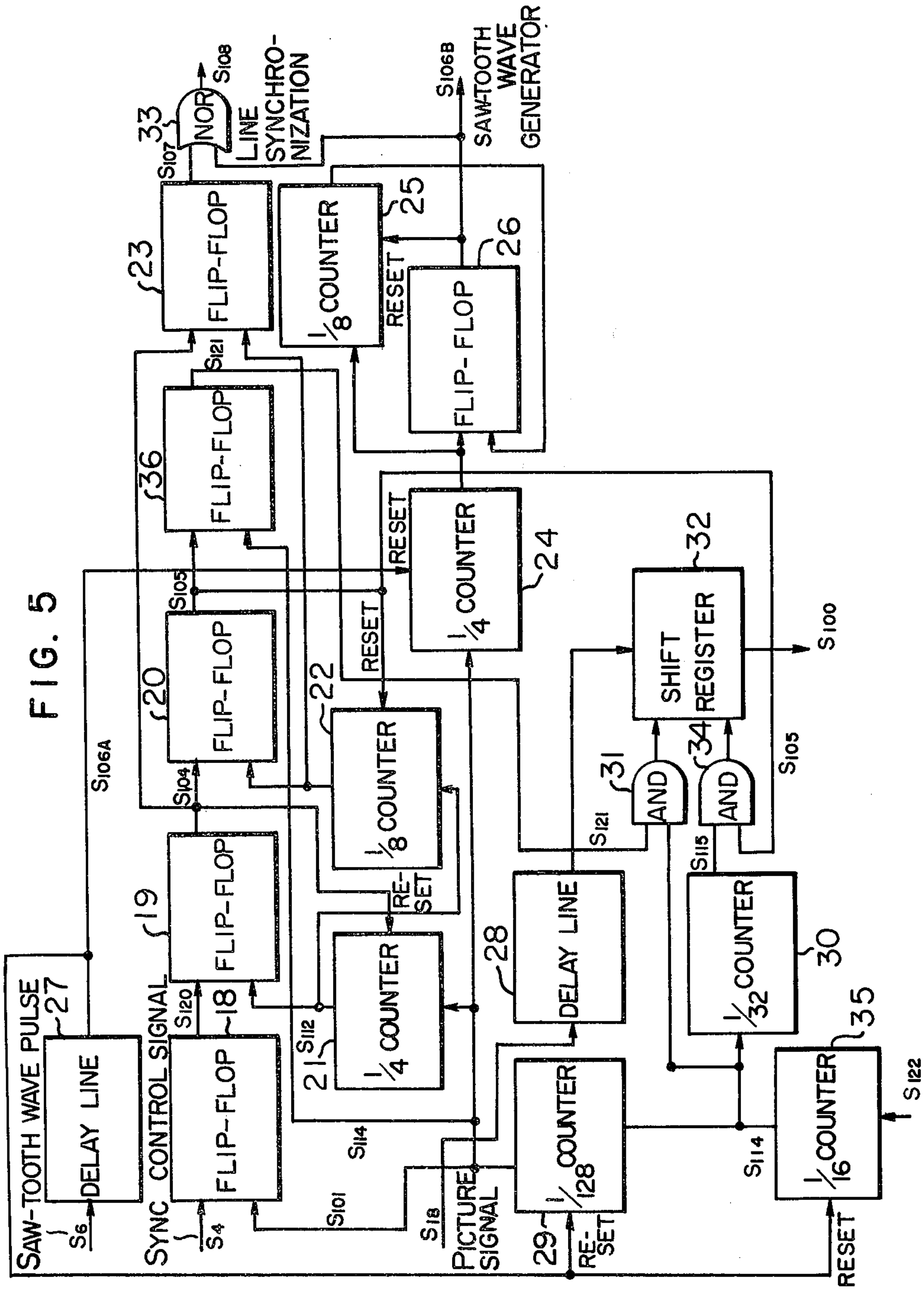
Figure 6:
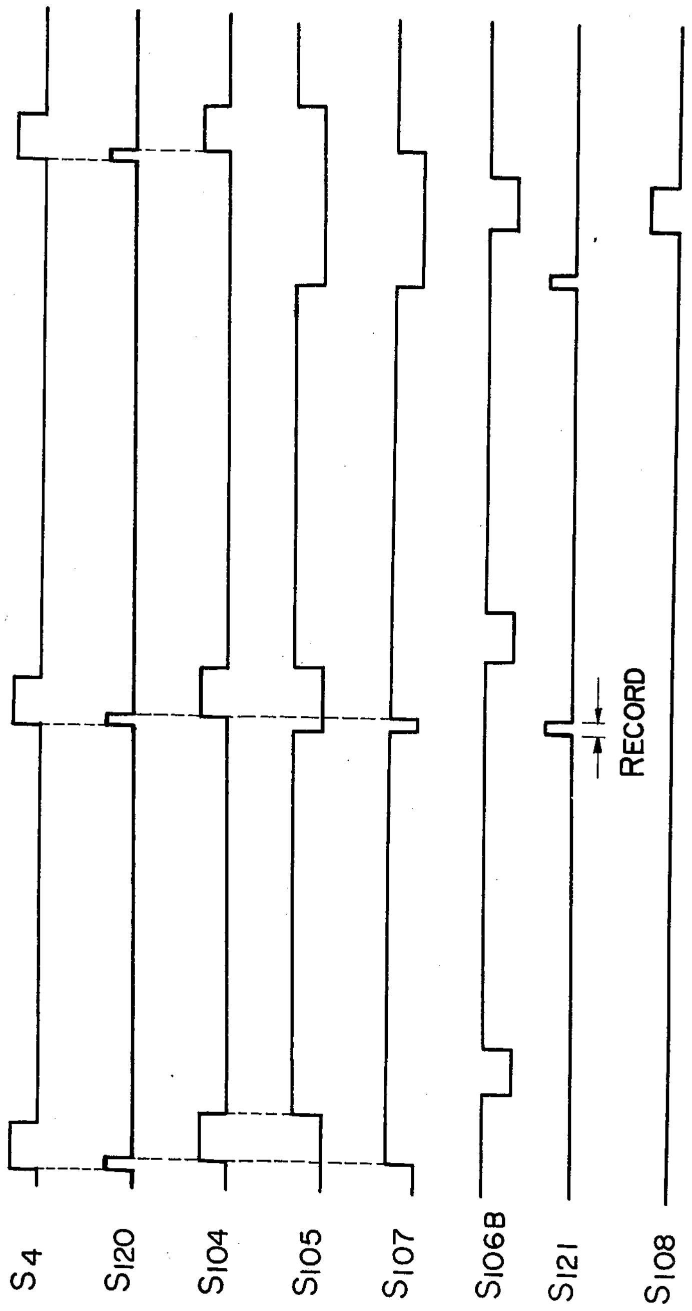
Figure 7:
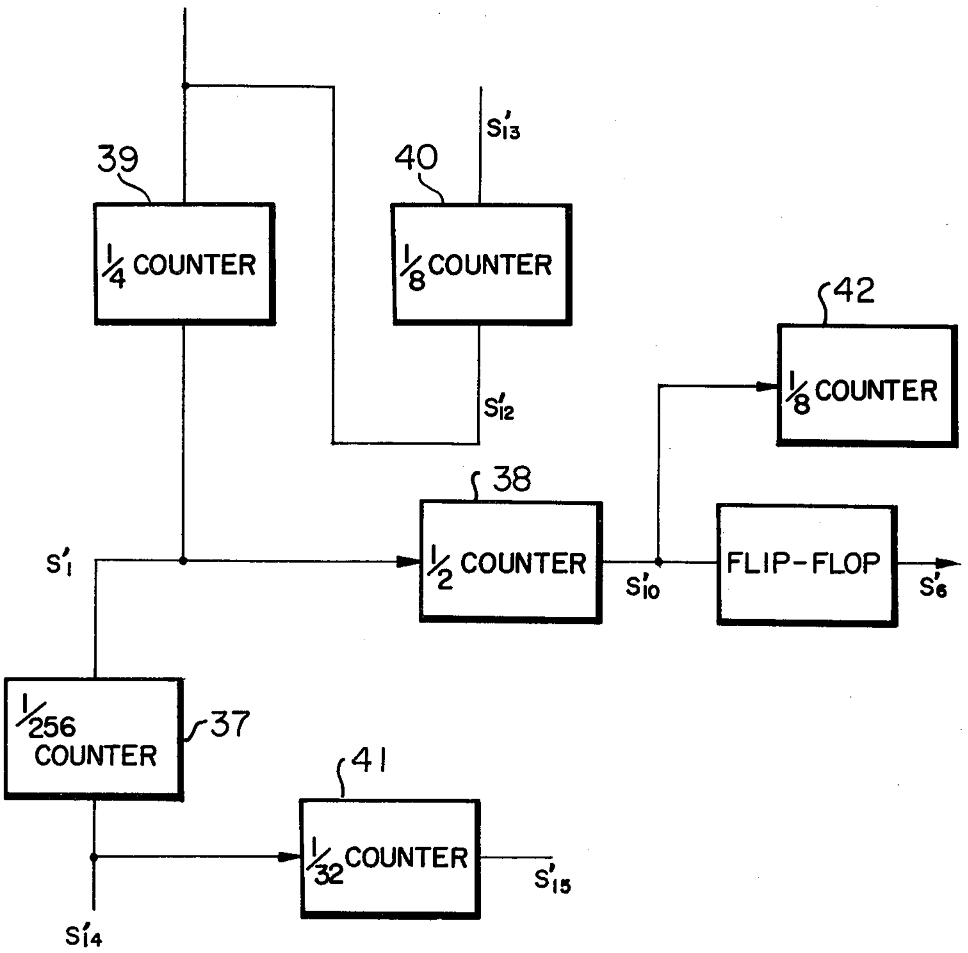
Figure 8:
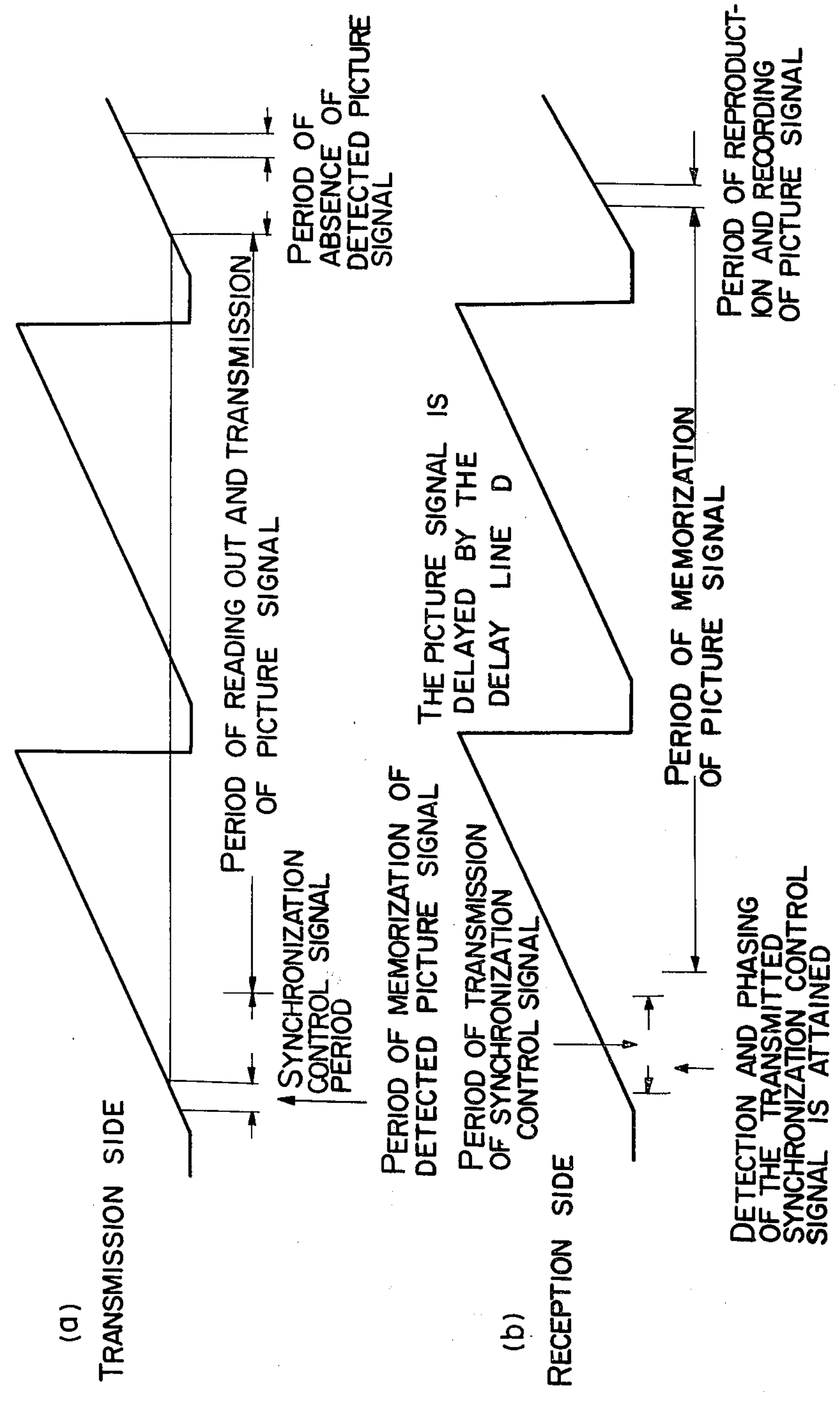
Figure 9:
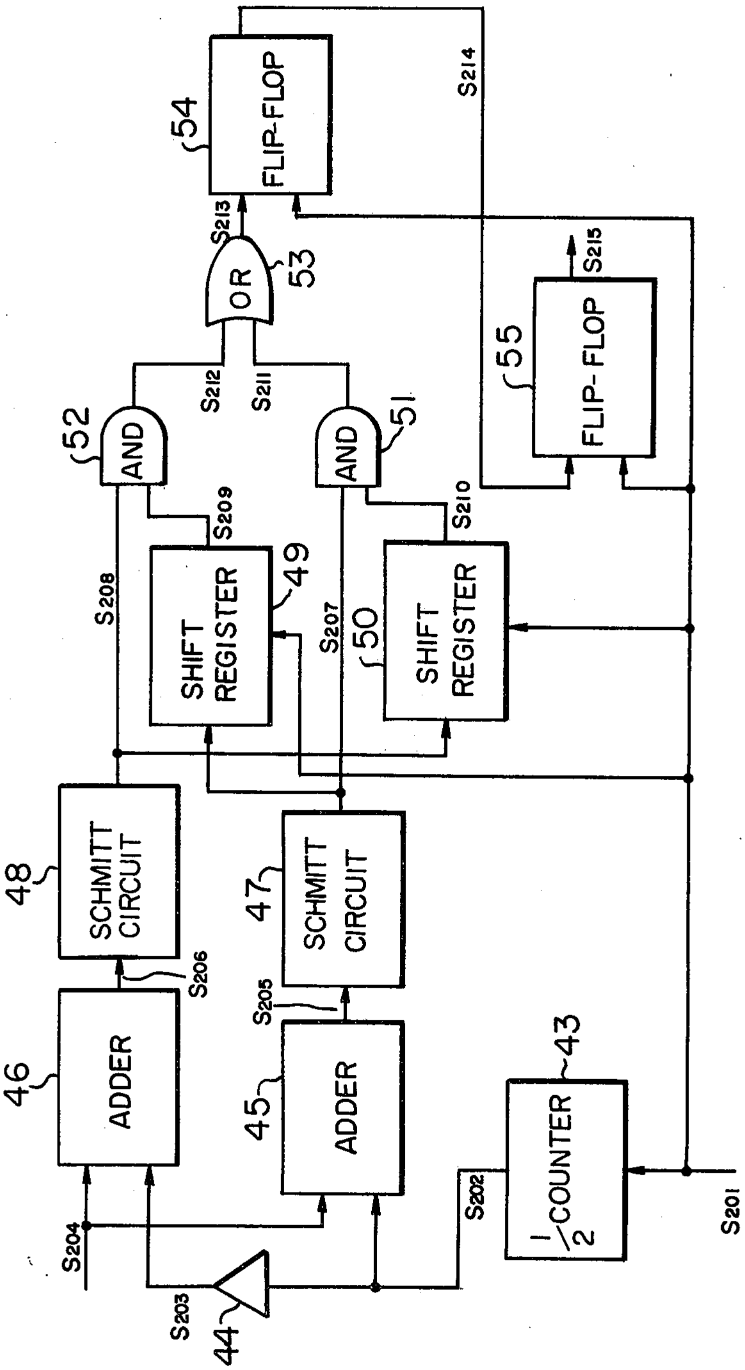
Figure 10:
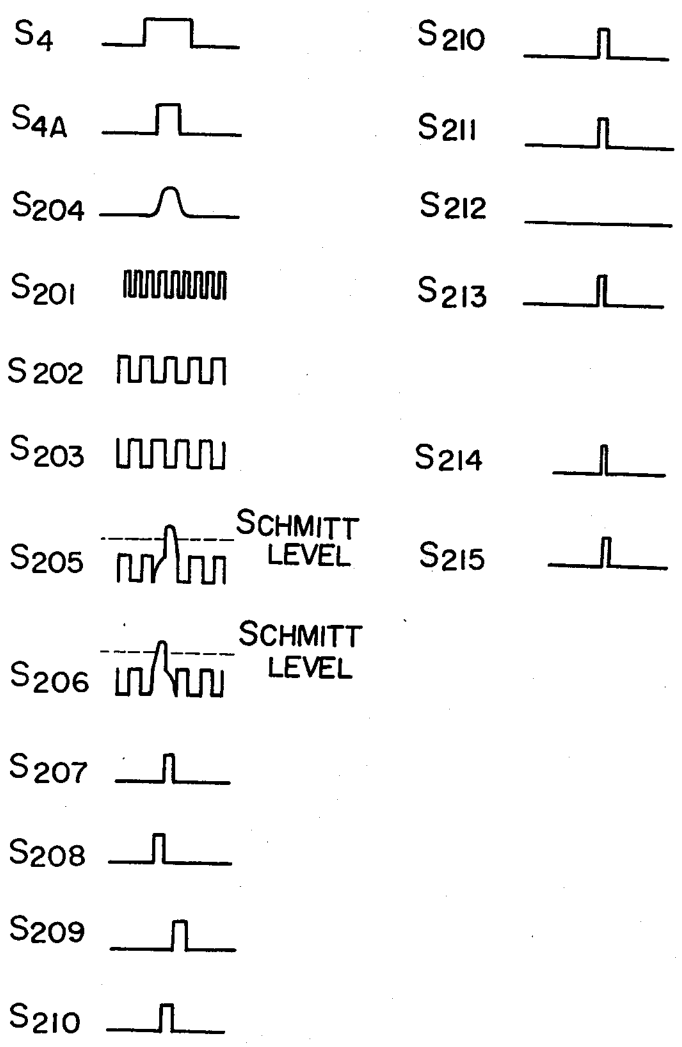
Figure 11:
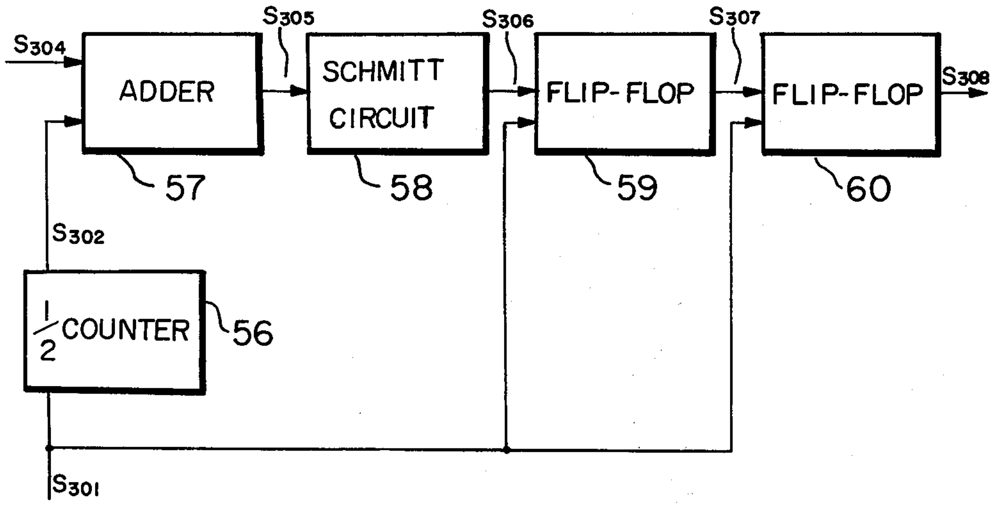
Figure 12:
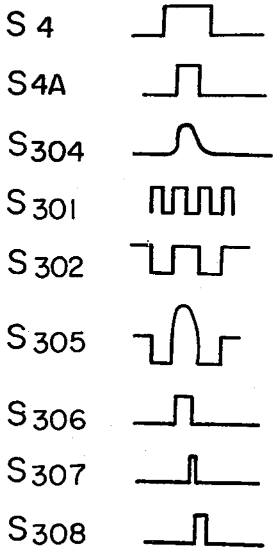
Figure 13:
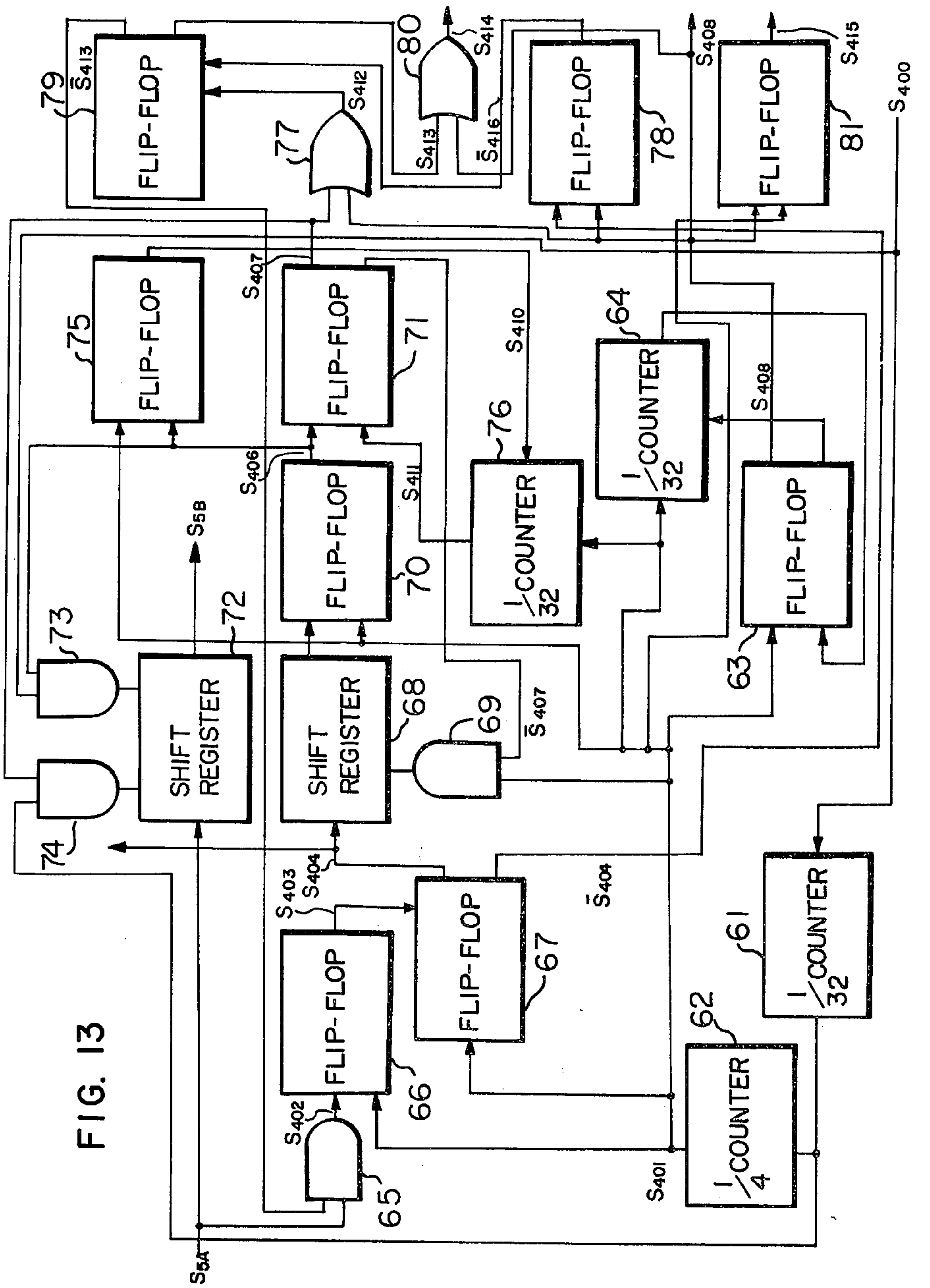
Figure 14:
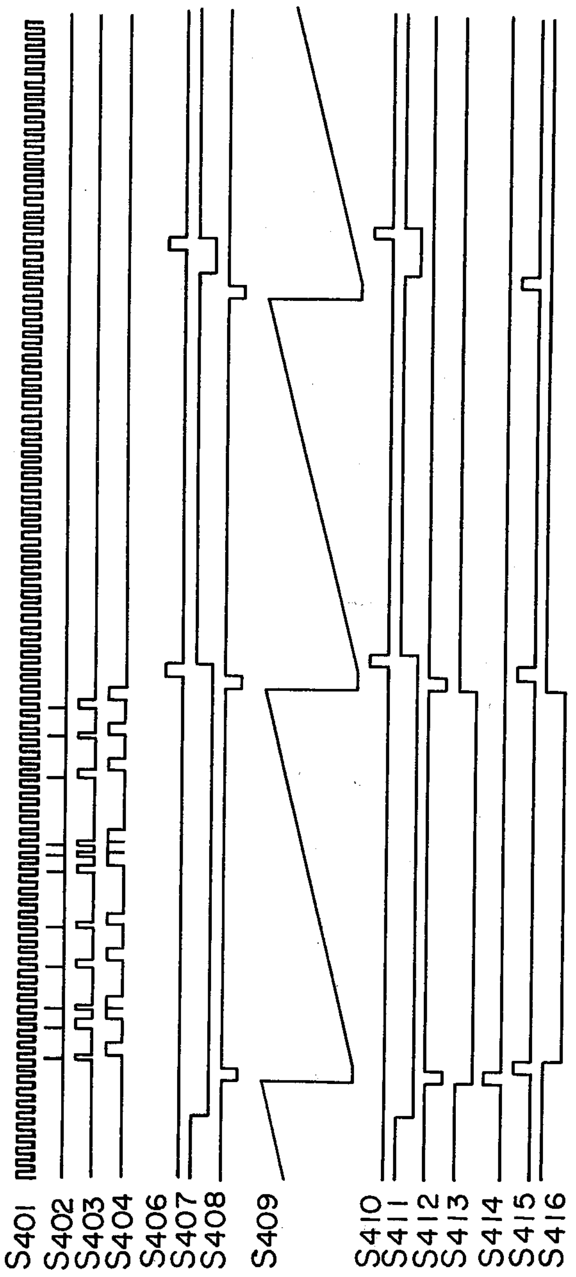
Figure 15:
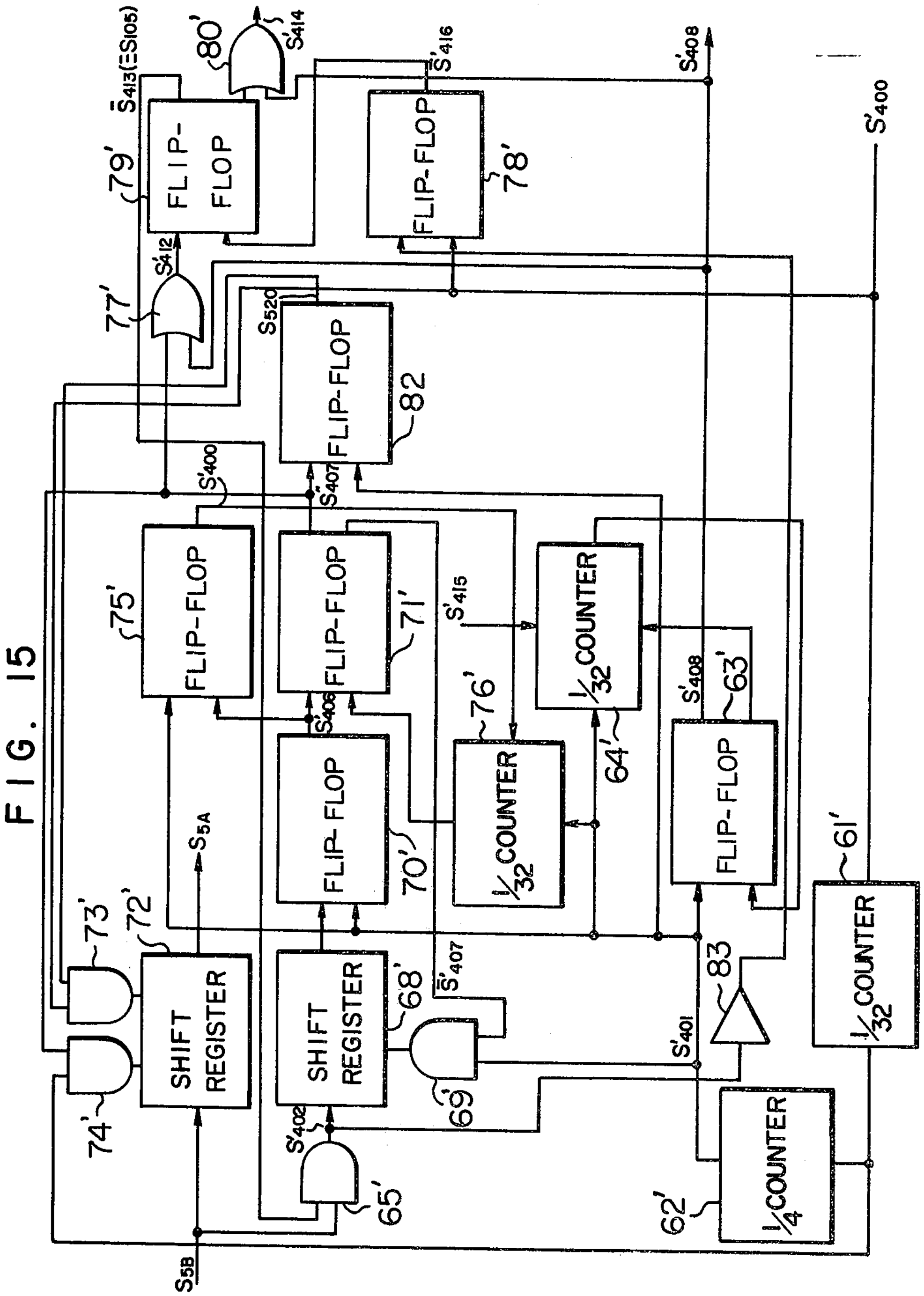
Figure 16:
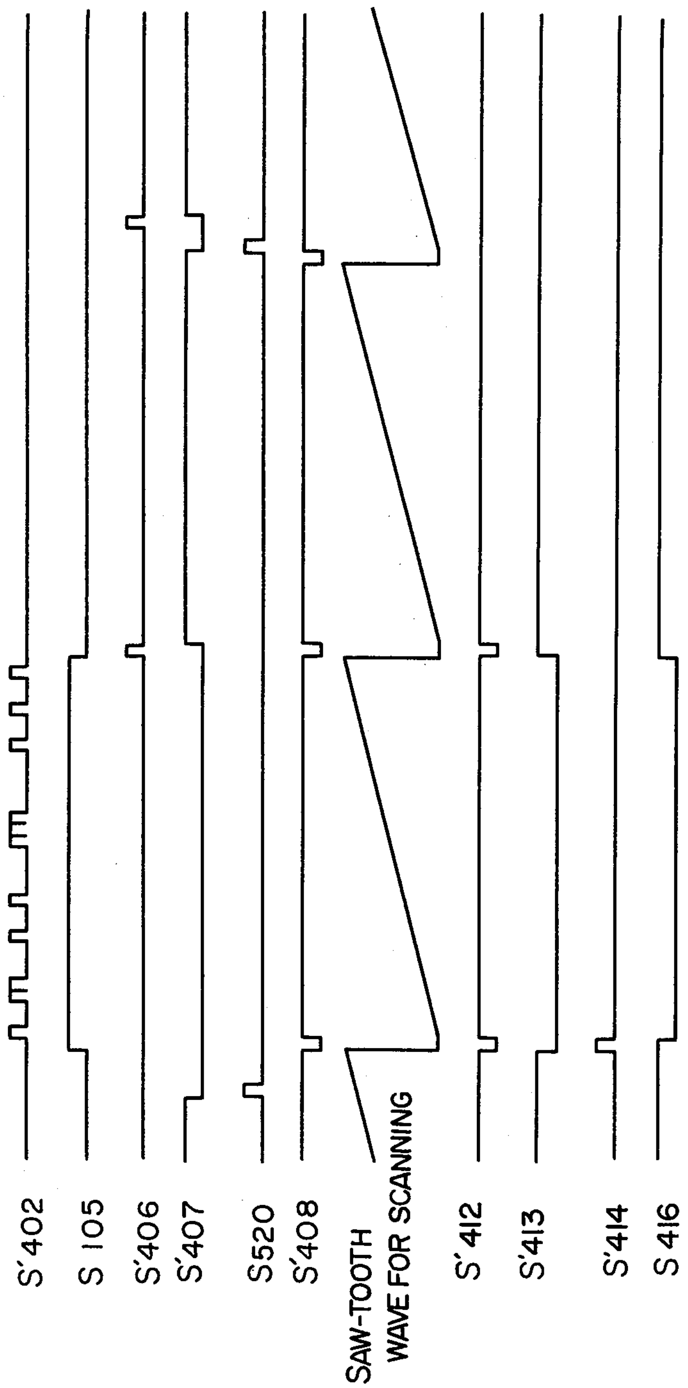
Figure 17:
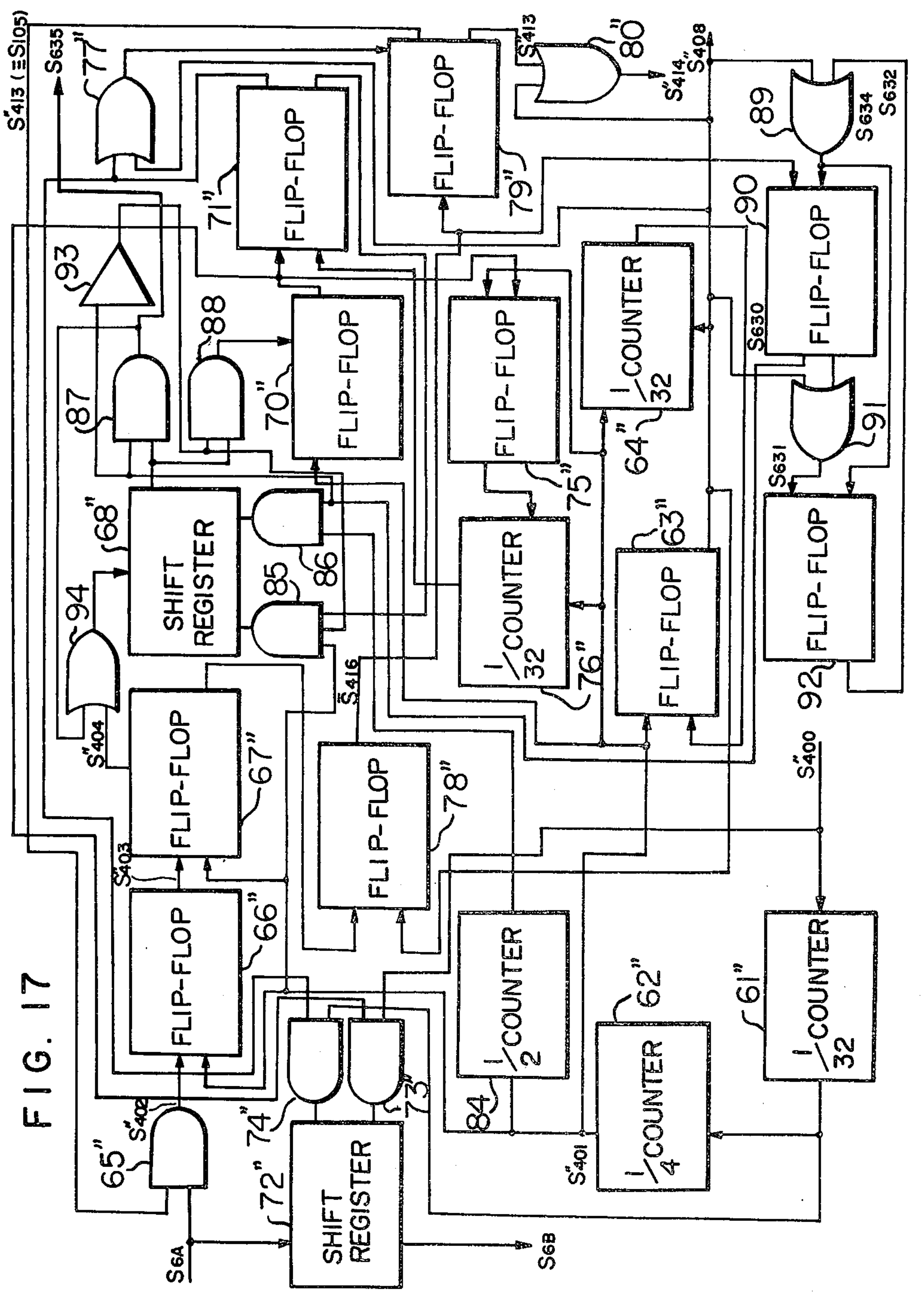
Figure 18:
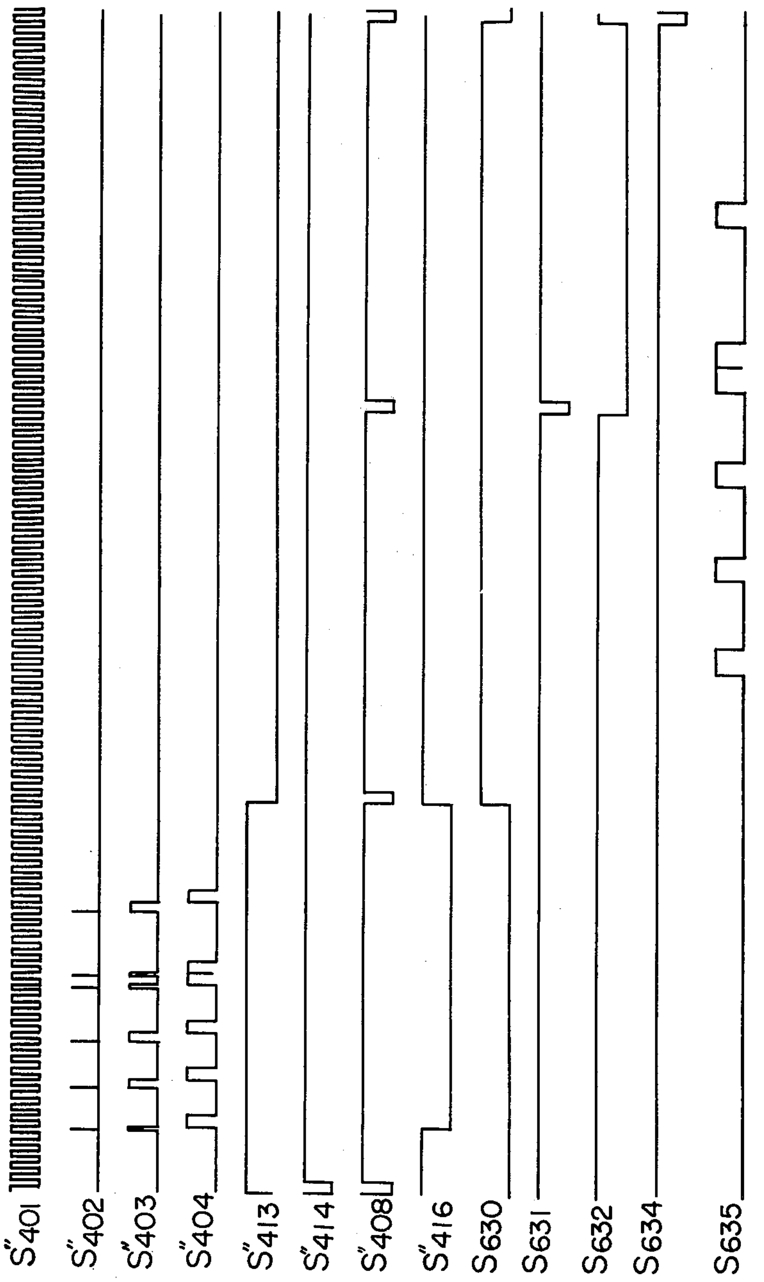
Figure 19:
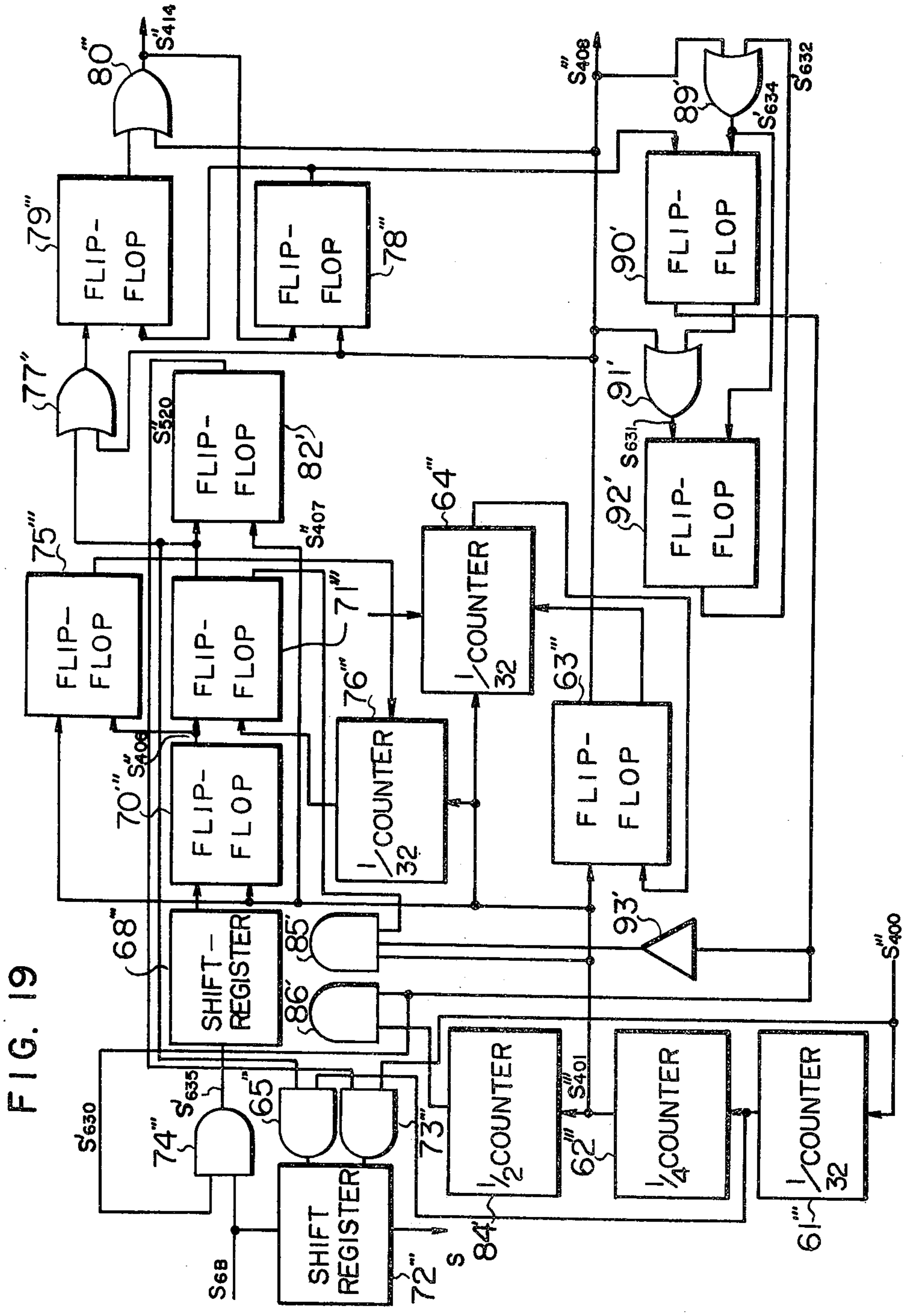
Figure 20:
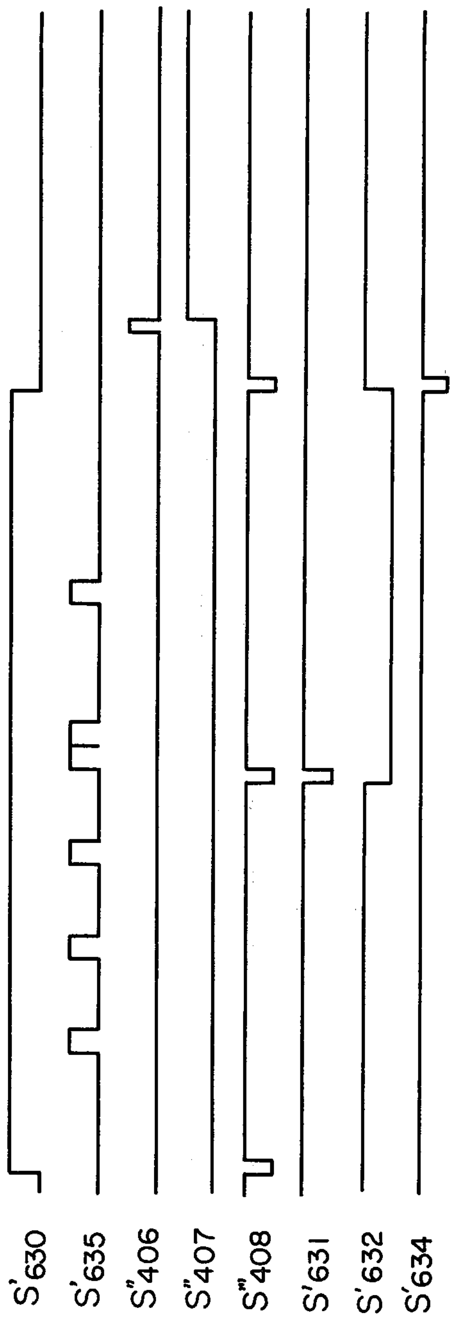
Figure 21:
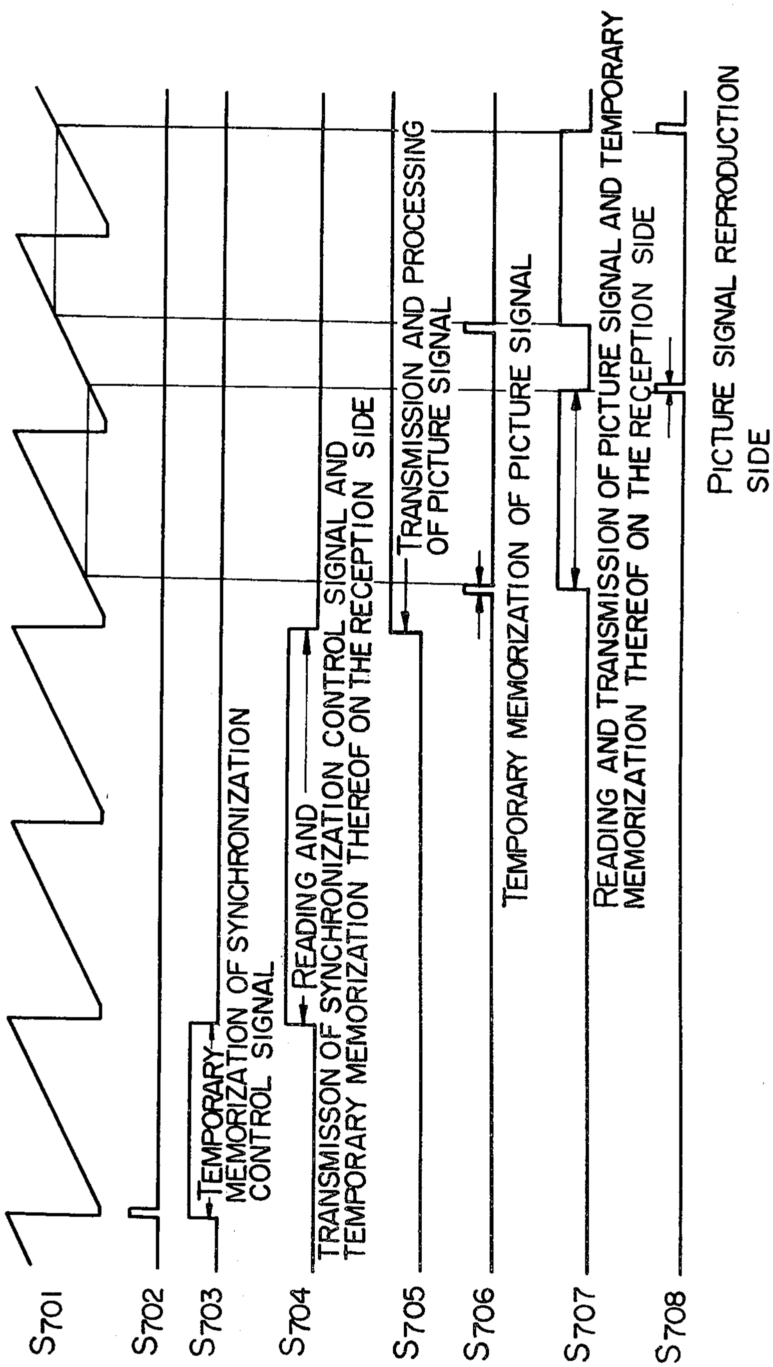
Figure 22:
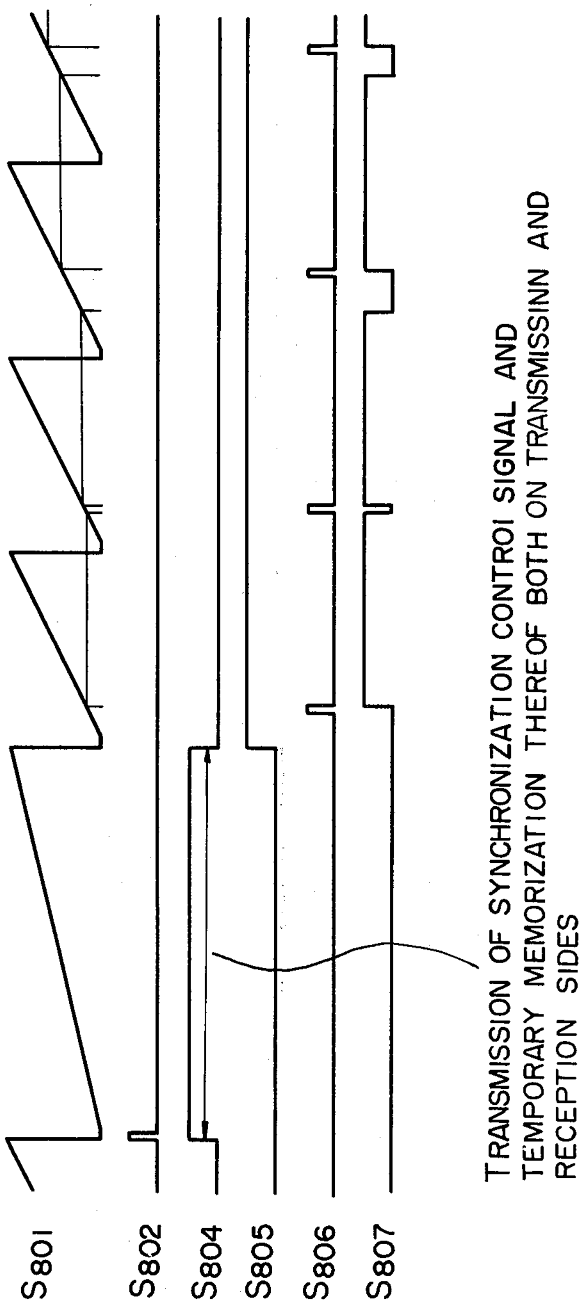
Figure 23:
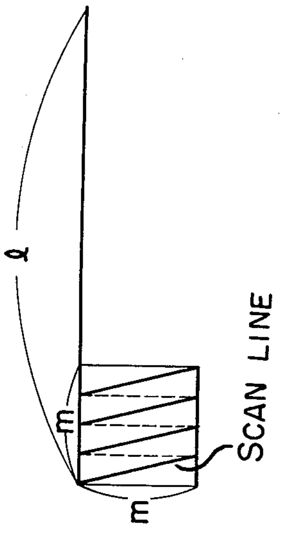
Figure 24:
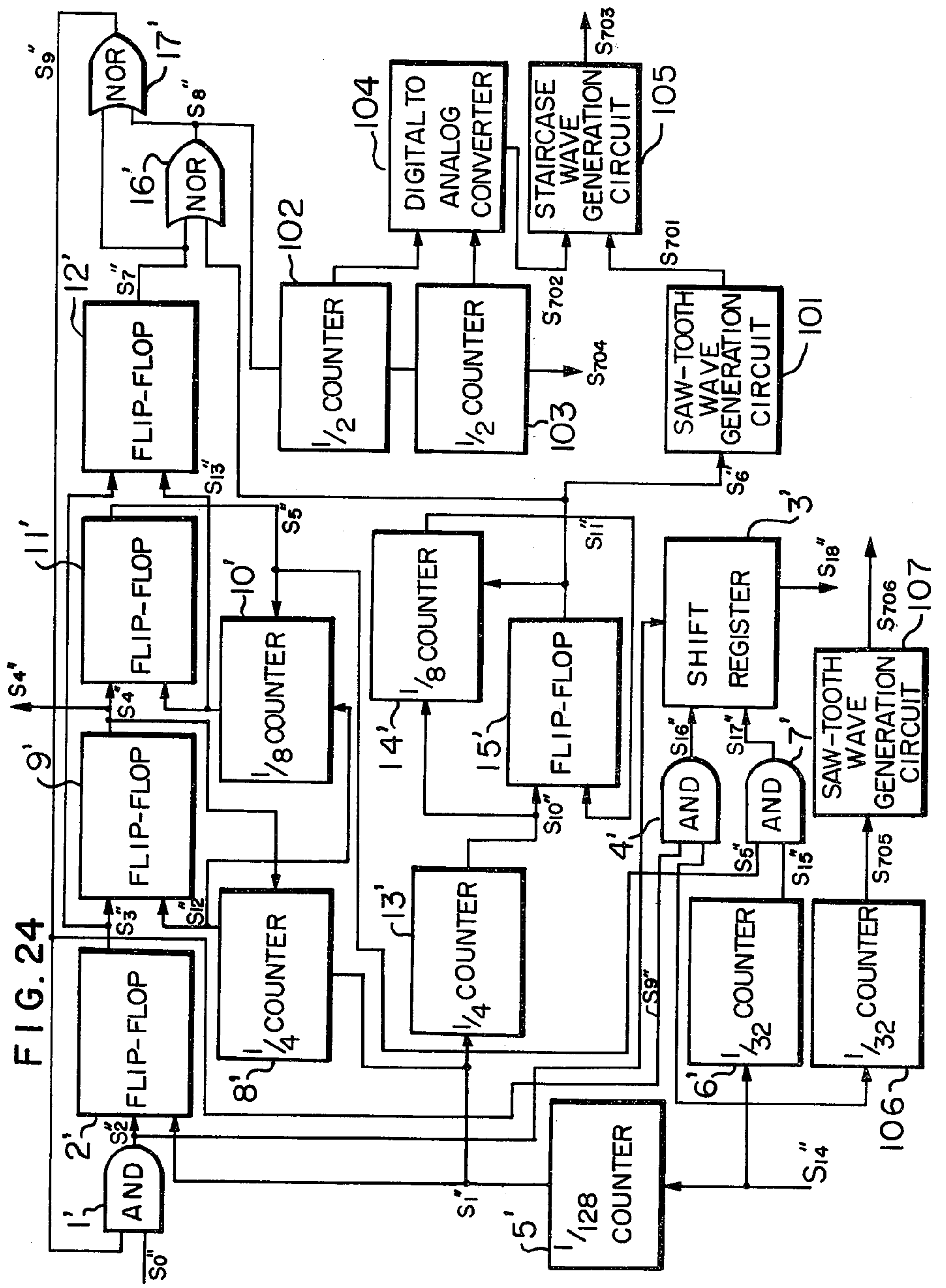
Figure 25:
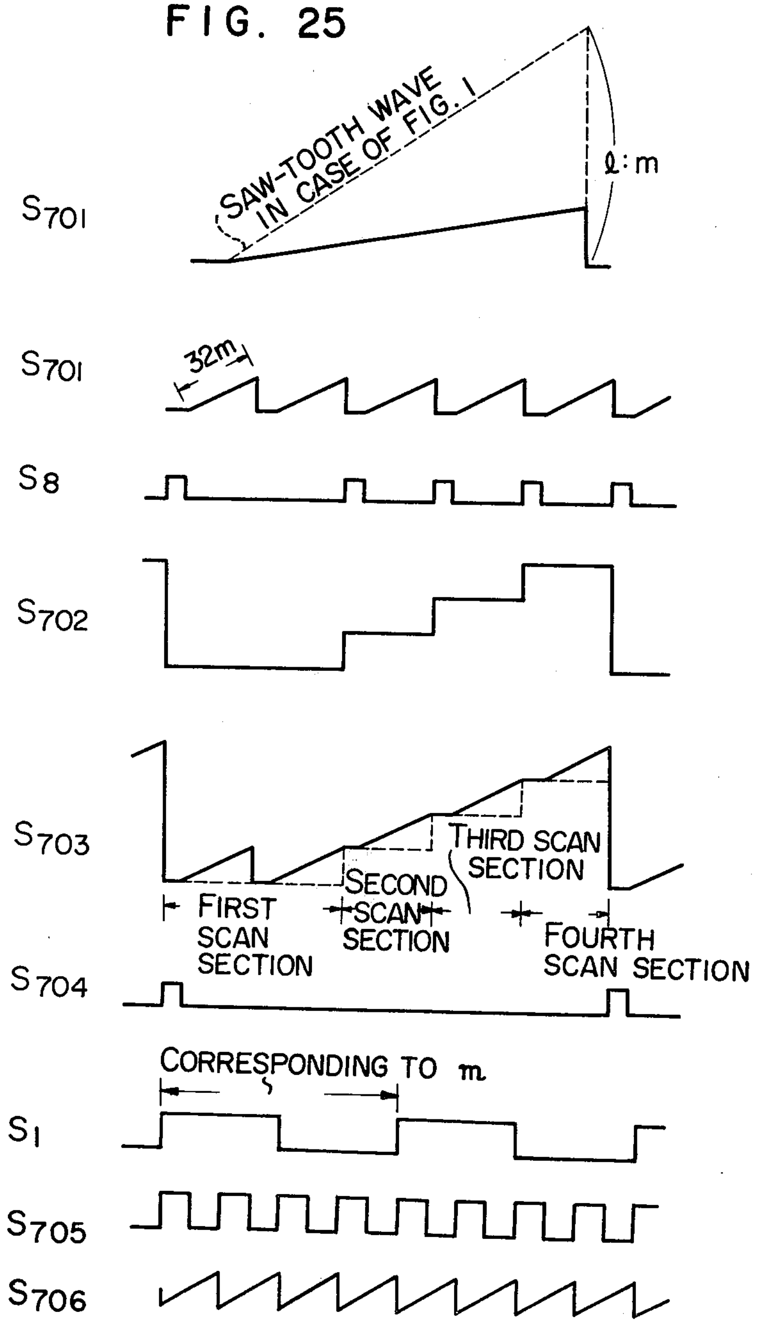
Figure 26:
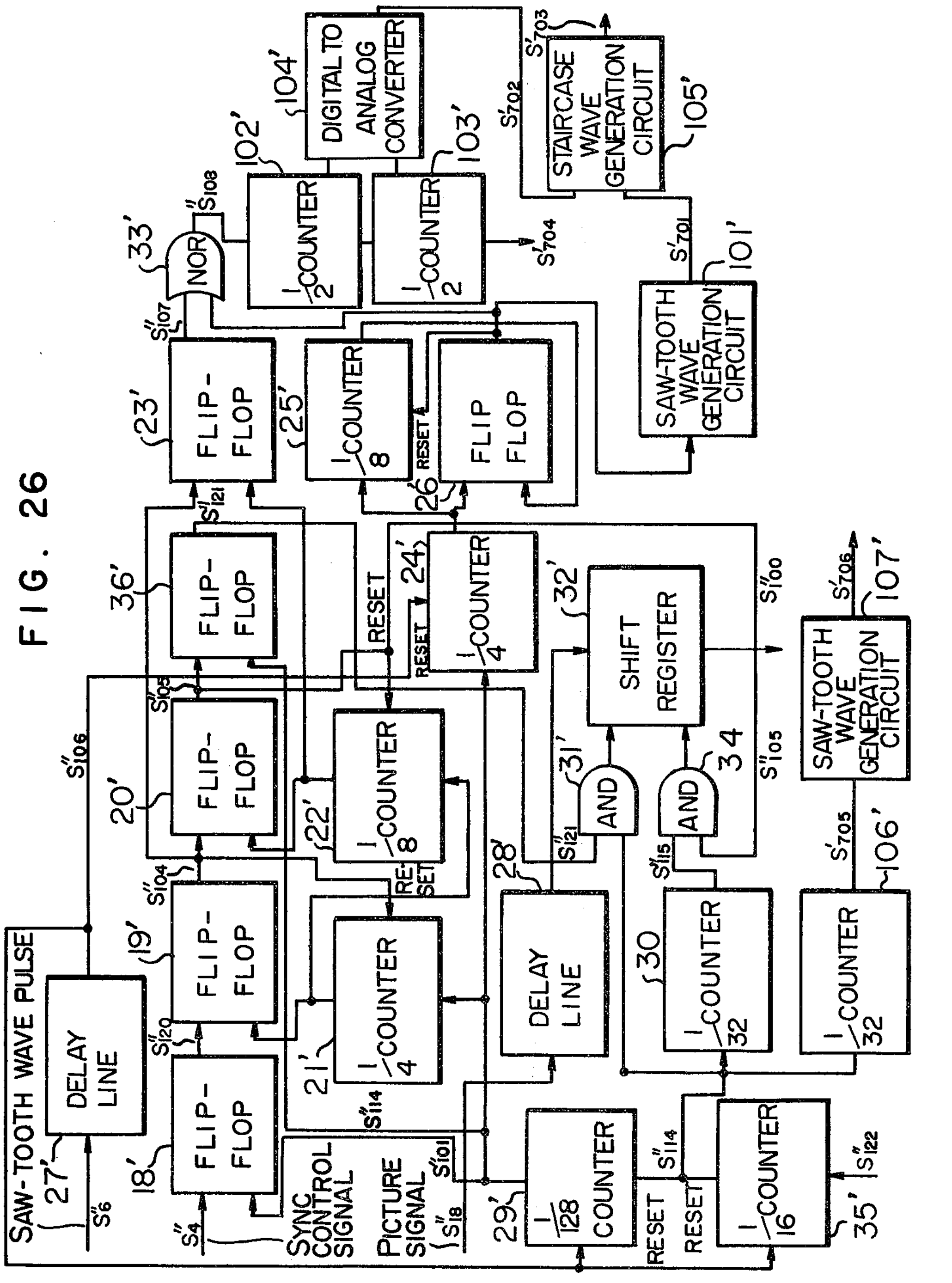

FIGS. 3*a* and 3*b* are waveform charts also to illustrate the operation of the system of the system of FIG. 1 and of a modified system;

FIGS. 4*a*, 4*b* and 4*c* are time charts illustrating examples of the facsimile transmission method;

FIG. 5 is a block diagram showing the reception side system of the first embodiment of the invention;

FIG. 6 is a waveform chart to illustrate the operation of the system of FIG. 5;

FIG. 7 is a block diagram showing part of a second embodiment of the invention;

FIG. 8 is a waveform chart to illustrate the operation of the system of FIG. 7;

FIG. 9 is a block diagram showing a synchronization control signal detection system in a third embodiment of the invention;

FIG. 10 is a waveform chart to illustrate the operation of the system of FIG. 9;

FIG. 11 is a block diagram showing a synchronization control signal detection system in a fourth embodiment of the invention;

FIG. 12 is a waveform chart to illustrate the operation of the system of FIG. 13;

FIG. 13 is a block diagram showing the transmission side system of a fifth embodiment of the invention;

FIG. 14 is a waveform chart to illustrate the operation of the system of FIG. 13;

FIG. 15 is a block diagram showing the reception side system of the fifth embodiment of the invention;

FIG. 16 is a waveform chart to illustrate the operation of the system of FIG. 15;

FIG. 17 ia a block diagram showing the transmission side system of a sixth embodiment of the invention;

FIG. 18 is a waveform chart to illustrate the operation of the system of FIG. 17;

FIG. 19 is a block diagram showing the reception side system of the sixth embodiment of the invention;

FIG. 20 is a waveform chart to illustrate the operation of the system of FIG. 19;

FIG. 21 is a waveform chart also to illustrate the operation of the embodiment of FIGS. 17 to 20;

FIG. 22 is a view similar to FIG. 20 but illustrating the operation of a system obtained by modifying the embodiment of FIGS. 17 to 20;

FIG. 23 is a view to illustrate principles underlying a seventh embodiment of the invention;

FIG. 24 is a block diagram showing the transmission side system of the seventh embodiment of the invention;

FIG. 25 is a waveform chart to illustrate the operation of the system of FIG. 24; and FIG. 26 is a block diagram showing the reception side system of the seventh embodiment of the invention.

The afore-mentioned dividing of the scan zone of the original into a plurality of divisions may be achieved by either one of two methods, namely a method of dividing one scan line into a plurality of divisions and a method of dividing the scan zone of the original into a plurality of area divisions.

The former method requires a comparatively simple circuit construction and may be realized comparatively easily. However, since each division is a line segment, the probability that picture information, i.e., black portion of the original, is present in the division, is high compared to the case of the latter method.

In case of the latter method, although the circuit construction and control involved are complicated compared to the case of the former method, the probability that picture information is present in one area division is low with the usual original compared to the former method provided that the information capacity of the area division is equal to the information capacity of the line division, so that the transmission efficiency may be improved that much.

Now, some embodiments based on the former method will be described in connection with FIGS. 1 to 22, and then a further embodiment based on the latter method will be described in connection with FIGS. 23 to 26.

A first embodiment of the invention will now be described in connection with FIGS. 1 to 6.

Figure 2:
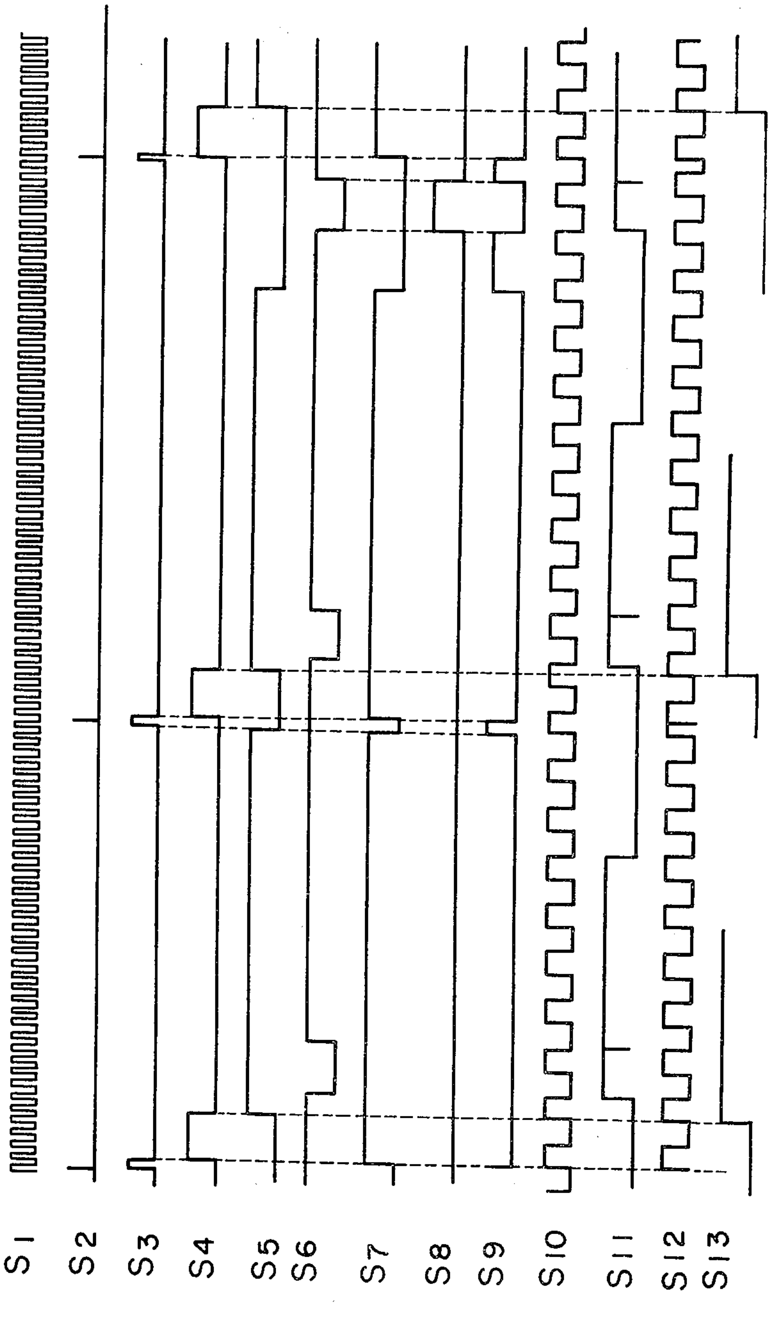
FIG. 2 is a waveform chart to illustrate the operation of the system of FIG. 1.

FIG. 1 shows the transmission side of the facsimile system according to the invention, and FIG. 2 shows waveforms involved in the operation of the same.

Reference character $S_0$ represents picture signal input, which is gated through an AND gate 1 by a gate signal $S_9$. For the sake of simplifying the description, the input picture signal $S_0$ is assumed to be in the form of a binary signal. It is obtained by converting a signal produced through predetermined scanning of an original with the usual high-speed facsimile transmission equipment, for instance electron tube transmitter, image pick-up tube, high-speed mechanical transmitter, etc., into the binary form. The gate signal $S_9$ is produced, on a time division basis, that is, on the basis of dividing one scan line of the input picture signal $S_0$ into N divisions (N being equal to 32 in this embodiment). In other words, an output signal $S_2$ from the AND gate 1 represents picture intelligence in one such division.

A flip-flop 2 detects a change of its input, that is, change of the afore-mentioned picture signal $S_2$ in one division. In this embodiment, by the term "change of the picture signal $S_2$" is meant a change of the picture signal $S_2$ from white level 0 into black level 1. When picture signal $S_2$ for one scan line division is permitted, the flip-flop 2 is set by the rising edge of the black level signal 1 and reset by the falling edge of a clock pulse $S_1$ corresponding to the end of that scan division. The period of the clock pulse signal $S_1$ corresponds to the period of one scan line division. The flip-flop 2 thus produces a detection signal output $S_3$ when it detects a change of the picture signal $S_2$ in one division, that is, when original picture information to be transmitted is contained in that division.

A flip-flop 9 is driven by the aforementioned detection signal $S_3$ to produce a synchronization control signal $S_4$ transmitted to the reception side. The synchronization control signal $S_4$ indicates that information to be transmitted is present in the afore-mentioned scan line division. The flip-flop 9 is set by the falling edge of the detection signal $S_3$ and reset at an instant when subsequent four clock pulses of the clock signal $S_1$ are counted by a counter 8. In other words, the synchronization control signal $S_4$ prevails for a period equal to four times the period of the clock pulse signal $S_1$, indicating that information to be transmitted is present in the aforementioned scan line division.

Meanwhile, the picture signal $S_2$ gated through the AND gate 1 is temporarily memorized in a shift register 3 under the control of a clock pulse signal $S_{16}$ (i.e., a basic clock pulse signal $S_{14}$), which is gated through an AND gate 4 by the gate signal $S_9$. The gate signal $S_9$ is such that, when the picture signal $S_2$ changes to black level 1 in a scan line division, both the AND gates 1 and 4 are simultaneously closed at the end of that division. The shift register 3 has the same number of bits as the frequency division factor of the counter 5; in this embodiment, it has 128 bits. This means that the period of one scan line division is equal to 128 times the period of the clock pulse signal $S_{14}$ and is also equal to the period of the clock pulse signal $S_1$.

The picture signal $S_2$ temporarily stored in the shift register 3 is read out from the instant of termination of the transmission of the synchronization control signal $S_4$ under the control of a clock pulse signal $S_{15}$, which is obtained by frequency dividing the clock pulse signal $S_{14}$ to 1/32 thereof through a counter 6. Since 128 pulses are required to read out all the content of the shift register 3, a gate signal $S_5$ for selecting 128 pulses of the clock pulse signal $S_{15}$ is produced from a flip-flop 11. The flip-flop 11 is set by the falling edge of the synchronization control signal $S_4$ and reset at an instant when subsequent 32 clock pulses of the clock pulse signal $S_1$ are counted by a counter circuit consisting of counters 8 and 10, thereby producing the gate signal $S_5$.

In the above manner, the picture signal $S_2$, which has been memorized in one scan line division with the 128-bit clock pulse signal $S_{14}$, is read out from the instant of termination of the transmission of the synchronization control signal $S_{14}$ under the control of the 128-bit clock pulse signal $S_{17}$ at 1/32 times the repetition frequency of the clock pulse signal $S_{14}$. In other words, it is read out as signal $S_{18}$ having an elongated period equal to 32 times the period of the afore-mentioned one scan line division. This mode of operation will become more apparent from FIG. 3.

FIG. 3 shows a saw-tooth wave for line scanning of a transmission side electron tube in relation to various time periods involved in the processing of the picture signal for facsimile transmission. The original is repeatedly scanned for each scan line with the saw-tooth wave of FIG. 3*a* until picture information in all divisions of the scan line containing information is transmitted. At an instant when the transmission of picture information in the final division of the scan line, is ended, the scanning is shifted to the next scan line. In order to produce a line synchronization control signal for the scanning line shift, a blanking period four times as long as the period *d* of one division is provided between adjacent saw tooth portions. In other words, the period of the saw-tooth wave corresponds to 36 times the period *d* of one scan line division. In FIG. 3*a*, indicated at *a* is the memorizing period that sets in when a change in the picture signal is detected, for instance, in the first scan line division $d_1$. Following this period is the period of transmission of the synchronization control signal four times as long as the period *d*, as indicated at *b*. The subsequent period *c* for reading out and transmission of the picture signal is 32 times as long as the period *d*.

It will be noted that like the period of the saw-tooth wave, which corresponds to 36 times the period *d* of one scan line division, the period from the end of writing of the picture signal till the end of its reading out, that is, the sum of the synchronization control signal transmission period *b* and picture signal reading out period *c*, also takes 36 times the division period *d*. Thus, the AND gate 1 is opened at the instant of the end of the picture signal reading out period *c*. This instant corresponds to a point of the saw-tooth wave, from which the next scan line division, in this case the second division $d_2$, begins to be under processing.

Indicated at *e* is a period, for instance covering the second to fifth divisions $d_2$ to $d_5$, during which no change of the picture signal is detected by the flip-flop 2. Thus, during this period neither synchronization control signal $S_4$ nor gate signal $S_5$ is produced. When a subsequent change of the picture signal is detected, for instance in the sixth devision $d_6$, there are again set periods *f*, *g* and *h*, which are respectively similar to the periods *a*, *b* and *c*.

Turning back to FIGS. 1 and 2, the generation of saw-tooth wave, line synchronization control signal and gate signal will be described.

Counters 13 and 14 and a flip-flop 15, constitute a circuit to produce the saw-tooth wave for line scanning. The clock signal $S_1$ is frequency divided to 1/4 thereof through the counter 13 to obtain a signal $S_{10}$, which is further frequency divided to 1/8 thereof through the counter 14 to obtain a signal $S_{11}$. The flip-flop 15 is set by the rising edge of a pulse of the signal $S_{11}$ and reset by the falling edge of the next pulse of the signal $S_{10}$. Thus, the output signal $S_6$ of the flip-flop 15 has a blanking period and retrace period equal to four periods of the clock pulse signal $S_1$.

The line scan signal $S_8$ is a signal indicating that the transmission of the picture signal in the last division of one scan line is ended, and it is produced from the saw-tooth wave generation pulse $S_6$ and signal $S_7$ in an NOR gate 16. The signal $S_7$ is obtained as a flip-flop 12 is set by the falling edge of the signal $S_3$ and reset by the rising edge of the signal $S_{13}$. The signal $S_7$ always "covers" a blanking period of the saw-tooth generation signal $S_6$ when facsimile information for one scan line division is read out and transmitted. While its level is reduced to zero when a scan line division containing no information sets in, the zero level period will not coincide in time with the blanking period of the saw-tooth generation signal $S_6$. It is only when the transmission of the picture signal in one scan line has been completed that both signals $S_6$ and $S_7$ are reduced to the zero level.

The gate signal $S_9$, which is impressed upon the AND gate 1, is produced from synthesizing the signal $S_7$ and line synchronization signal $S_8$ in an NOR gate 17. The gate signal $S_9$ is at level 1 to render the AND gate 1 open only when scanning a scan line division with the saw-tooth wave, and it is at level 0 to render the AND gate 1 closed in case a change in the picture signal in that division is detected until the transmission of the picture signal is ended. In other words, when a picture signal is detected in a scan line division, the gate signal $S_9$ becomes at level 0 at the instant of completion of the scan. However when no picture signal is detected in the scan line division, the gate signal $S_9$ is maintained at level 1 and hence the scan of the next scan line division is performed. The signal $S_9$ is thus maintained at level 1 until a picture signal is detected in any of the succeeding scan line divisions.

FIG. 3*b* shows a modified operation mode in a second embodiment. In this mode, the synchronization control signal transmission period is divided into two different periods *b'* and *b''*. The former period is three times as long as the scan line division period *d* and is provided immediately before the reading of the picture signal, while the latter is the same as the scan line division period *d* and is provided immediately after the reading of the picture signal.

FIG. 4 shows an example of the method of transmitting a composite signal including picture signal and synchronization control signal. Shown in FIG. 4*a* is the composite signal. Here, the picture signal is assumed to change to and from levels 1 and 0. Shown in FIG. 4*b* is an amplitude modulation with the signal C. In this example, the modulation degree is 60 percent for the picture signal portion and 100 percent for the synchronization control signal portion. Shown in FIG. 4*c* is another example, in which the picture signal is transmitted as FM or FS signal and the synchronization control signal is transmitted as carrier-suppressed 100-percent AM signal. Other transmission methods are also possible. In these methods, an important thing is to reduce the phase deviation in the detection on the reception side.

FIG. 5 shows the reception side of the facsimile system according to the invention, and FIG. 6 shows waveforms involved in the operation of the same.

Reference characters $S_4$, $S_6$ and $S_{18}$ respectively represent synchronization control signal, saw-tooth wave generation signal and picture signal which are derived from the signal transmitted from the transmission side and respectively correspond to the signals $S_4$, $S_6$ and $S_{18}$ shown in FIG. 1. Of course reduction of the signal-to-noise ratio and waveform distortion are more or less introduced into these signals during transmission.

From the detection of the synchronization control signal $S_4$ the appearance of a signal containing picture information can be previously known. While the transmitted synchronization control signal $S_4$ is a single pulse, it is natural to think that the detection of the rising edge of this pulse is slightly delayed behind the instant of its transmission. A flip-flop 18 is set by the rising edge of the synchronization control pulse $S_4$ and reset at the end of the subsequent period of a clock pulse $S_{101}$, thereby providing a signal $S_{120}$, with which the synchronization control signal $S_4$ is detected. The clock pulse signal $S_{101}$ has the same period as the clock pulse signal $S_1$ mentioned earlier in connection with FIG. 1. The detection and phasing of the synchronization control signal $S_4$ on the reception side are very important, as will be described below. In practice, more intricate matters are involved here, but which are principally unimportant and are simplified here.

Flips-flops 19 and counters 21 and 22 operate entirely in the same way as the corresponding flip-flops 9 and 10 and counters 8 and 10 shown in FIG. 1. Also, the signals $S_{104}$ and $S_{105}$ produced from the flip-flops 19 and 20 are the same as the respective signals $S_4$ and $S_5$ described earlier in connection with FIG. 1.

The detected picture signal $S_{18}$ is written in and read out of a shift register 32 as will be described. A clock pulse signal $S_{114}$, which has the same pulse repetition frequency as the clock pulse signal $S_{14}$ described earlier in connection with FIG. 1, is frequency divided in a 1/32 counter 30 similar to the counter 6 in FIG. 1 to obtain a clock pulse signal $S_{115}$. This clock pulse signal $S_{115}$ is gated through an AND gate 34 by the gate signal $S_{105}$ for writing the picture signal $S_{18}$, which has been delayed for a predetermined time as it is passed through a delay line 28, in the shift register 32. This clock pulse signal $S_{115}$ for the writing has the same pulse repetition frequency as the clock pulse signal $S_{15}$ for the reading out in the transmission side of FIG. 1. This is made so in order to opposite frequency convert the detected picture signal with respect to the transmission side. The reading out of the memorized picture signal $S_{18}$ from the shift register 32 is done under the control of the clock pulse signal $S_{114}$ permitted through an AND gate 31 rendered open by a gate signal $S_{121}$ obtained as a flip-flop 36 is set by the falling edge of the signal $S_{105}$ and reset at the end of the subsequent period of the clock pulse signal $S_{101}$. Similar to the transmission side, the shift register 32 has exactly 128 bits. This means that the clock pulses for writing and reading out and their gate periods in the reception side are related exactly opposite with respect to the transmission side. The signal $S_{100}$ read out of the shift register 32 in the above manner corresponds to the input picture signal $S_0$ on the transmission side.

The generation of the saw-tooth wave generation pulse $S_{106B}$ will now be described. Counters 24 and 25 and a flip-flop 26 are similar to the respective counters 13 and 14 and flip-flop 15 on the transmission side of FIG. 1, except that a reset signal $S_{106A}$ is impressed upon the counter 24. The reset signal $S_{106A}$ is obtained by delaying the saw-tooth wave generation signal $S_6$ through a delay line 27. The delay line 27, as well as the delay line 28, is provided in order to compensate for the phase delay with respect to the signal $S_{104}$. The reset signal $S_{106A}$ is added, in addition to the counter 24, also as a reset signal to counters 29 and 35. Accordingly, the reception system of FIG. 5 operates on the basis of the reset signal $S_{106A}$. While the reset signal $S_{106A}$ may be directly used in place of the saw-tooth wave generation signal $S_{106B}$, in this embodiment it is processed to produce the signal $S_{106B}$, because the saw-tooth wave generation signal $S_{16}$ is usually transmitted momentarily before transmitting the picture signal.

The generation of a line synchronization control signal $S_{108}$ will now be described. A flip-flop 23 and an NOR gate 33 are similar to the respective flip-flop 12 and NOR gate 16 shown in FIG. 1. The flip-flop 23 is set by the rising edge of the signal $S_{104}$ and reset at the end of the thirty second period of the signal $S_{101}$ from the falling edge of that signal $S_{104}$, thus producing a signal $S_{107}$, which of course corresponds to the signal $S_7$ mentioned earlier in connection with FIG. 1. Similar to the transmission side of FIG. 1, this signal $S_{107}$ is added to a NOR gate 33, which also receives the saw-tooth wave generation signal $S_{106B}$. In this way, the line synchronization control signal $S_{108}$ is obtained from the NOR gate 33.

As has been described, in the above reception side system the phase of the detection of the synchronization control signal $S_4$ is synchronized to the clock pulse signal $S_{101}$. However, if the detection happens to be delayed for one period of the clock pulse signal $S_{101}$, it would lead to such result as if an extra scan line division of level 0, that is, a scan line division containing no picture information, existed immediately before the proper scan line division. In such case, the recording position would be shifted for one scan line division. In this respect, the selection of the number N of the divisions in one scan line and the pulse repetition period of the clock pulses $S_1$ and $S_{101}$ determining the period of one scan line division is important. Also, it is important in practice to select a synchronization control signal transmission method, which is convenient for the detection and phasing of the synchronization control signal on the reception side.

In the above reception side system of FIG. 5, a counter 35 is provided to the end of having both the transmission and reception sides coinside with each other as much as possible with respect to clock signal $S_{122}$.

FIG. 7 shows part of the transmission side of a different embodiment, which is given to the above end. While FIG. 7 shows only counters, the construction of this embodiment is the same as the construction of FIG. 1 except that counter 37 has a frequency division factor of 1/256, that counter 38 has a frequency division factor of 1/2 and that 256 bits are required for the shift register.

FIG. 8 shows the operation mode of this embodiment in comparison with the mode shown in FIG. 3. In this mode, the period of the clock pulse signal $S_1'$ is double the period of the clock pulse signal $S_1$. Thus, the number N of the divisions in one scan line is reduced to 16, half the number in the embodiment of FIG. 1, but the picture signal is read out for a period equal to double the line scan period. Signals $S_6'$, $S_{10}'$ and $S_{12}'$ to $S_{15}'$ shown in FIG. 7 respectively correspond to the signals $S_6$, $S_{10}$ and $S_{12}$ to $S_{15}$ shown in FIG. 1, and counters 39, 40, 41 and 42 in FIG. 7 respectively correspond to the counters 8, 10, 6 and 14 in FIG. 1.

Since the period of transmission of the synchronization control signal is doubled, the detection and phasing of this signal is made easier. However, the transmission efficiency is slightly reduced. Table 1 below shows the above relations in the embodiments of FIGS. 1 and 7.

Table 1

| | A | B<br>Period or frequency | C |
|---|---|---|---|
| $S_{14}$ | 512 kHz | 512 kHz | 640 kHz |
| $S_{15}$ | 16 kHz | 16 kHz | 20 kHz |
| $S_1$ | 0.25 msec. | 0.5 msec. | 0.4 msec. |
| $S_{10}$ | 1 msec. | 1 msec. | 0.8 msec. |
| $S_{12}$ | 1 msec. | 2 msec. | 1.6 msec. |
| $S_{13}$ | 8 msec. | 16 msec. | 12.8 msec. |
| $S_6$ | 9 msec. | 9 msec. | 7.2 msec. |
| | | Maximum picture frequency | |
| $S_{18}$ | 1.59 kHz | 1.59 kHz | 1.77 kHz |
| $S_0$ | 51.0 kHz | 51.0 kHz. 56.7 kHz | |

(Note) The resolution is 96 lines per inch in 8 and ⅛ inches by 11 inches.

In the above Table 1, the column A is for the system of FIG. 1, column B is for the system of FIG. 7, and column C is for a system where the clock pulse signal corresponding to the signal $S_{14}'$ in the FIG. 7 system has a frequency of 640 kHz.

Where the period of the clock pulse signal $S_1$ is short, the phasing of the synchronization control signal is difficult and requires an appropriate construction, but the transmission efficiency is improved. The picture signal frequency in the above examples, is suitably selected by taking the usual use of telephone lines for transmission into consideration. In either FIG. 1 system or FIG. 7 system, the frequency division factor of any counter takes the form of *n* powers of 2. This is advantageous in simplifying the system, but the frequency division factor may also take other suitable forms than the form of *n* powers of 2. It is also to be noted that by temporarily memorizeing the picture signal in the shift register and opening the AND gate after the reading out of the content of the register is ended, a continuous signal can be transmitted without involving any wasteful time. This constitutes a feature of the invention. Further, the number of the shift register stages is selected by selecting a clock pulse signal of a considerably higher frequency compared to the picture signal frequency in order that the quality of the picture signal will not be affected by its writing and reading in and out of the shift register. In addition, in the case of a picture signal having a gradation character, parallel POM binary signals may be written and read by using parallel registers. In so doing, the same basic principles may be employed. Besides, since the picture signal can also be transmitted as an analog signal, the signal processing will hardly lead to deterioration of the picture quality. Furthermore, insofar as due care is paid to the phasing of the synchronization control signal, the processed signal will be as being immune to the signal-to-noise reduction and pulse noise as the signal before processing. Moreover, even if the transmitted synchronization control signal has a considerable length, sufficient improvement of the transmission efficiency can be expected. By way of example, with the system according to the invention it is possible to achieve facsimile transmission of picture information of a usual A-4 size original with a resolution of four lines/mm through the usual telephone line in one minute.

FIG. 9 shows a further embodiment, which ensures reliable and correct detection and phasing of the synchronization control signal on the reception side which is very important as mentioned earlier. FIG. 10 shows waveforms involved in the operation of this embodiment.

Signal $S_4$ shown in FIG. 10 is the synchronization control signal described earlier in connection with FIG. 1. This signal, however, is not actually transmitted, but in this period a signal $S_{44}$ (FIG. 10) is transmitted as the synchronization control pulse. On the reception side, the signal $S_{44}$ is assumed to be detected as waveform $S_{204}$ due to possible signal-to-noise reduction and waveform distortion. Signal $S_{201}$ is the reception side clock pulse signal corresponding to the clock signal $S_{101}$ mentioned earlier in connection with FIG. 5. In this embodiment, the signal $S_{44}$ is correctly and reliably phased in terms of the period of the clock pulse signal $S_{201}$. The signal $S_{201}$ enters a 1/2 counter 43. Signals $S_{208}$ and $S_{207}$ are produced from respective Schmitt circuits 47 and 48, signal $S_{210}$ is produced from a shift register 50, signal $S_{213}$ is produced from an OR gate 53, and signals $S_{214}$ and $S_{215}$ are produced from respective flip-flops 54 and 55. The period of the clock pulse signal $S_{201}$ is set to be one half the pulse interval of the transmitted signal $S_{44}$. The frequency of the clock pulse signal $S_{201}$ is reduced by the counter 43 into one half. The clock pulse signal $S_{201}$ is coupled to an inverter 44 to produce a signal $S_{203}$ 180° out of phase with the signal $S_{203}$. The period of both signals $S_{202}$ and $S_{203}$ is double the period of the clock pulse signal $S_{201}$. An adder 45 produces the sum of the received signal $S_{204}$ and signal $S_{202}$, while another adder 46 produces the sum of the signals $S_{204}$ and $S_{203}$. The output signals $S_{205}$ and $S_{206}$ (FIG. 10) of the adders 45 and 46 are shaped in the respective Schmitt circuits 47 and 48 with respect to a Schmitt level thereof (as indicated by dashed line in FIG. 10) to obtain the signals $S_{207}$ and $S_{208}$, for which respective one-bit shift registers 49 and 50 provide a delay time equal to one period of the clock pulse signal $S_{201}$. When a synchronization control pulse is transmitted, either AND gate 51 or 52 produces output signal $S_{211}$ or $S_{212}$, which is taken out through the OR gate 53 and shaped through the flip-flops 54 and 55 to achieve the phasing of the synchronization control signal. The output signal $S_{215}$ corresponds to the signal $S_{120}$ mentioned earlier in connection with FIG. 5, and it has been mentioned earlier in a simple manner in connection with FIG. 5.

In the above FIG. 9 example, the pulse repetition period of the clock pulse signal $S_{201}$ is too short to detect the synchronization control pulse of the aforementioned pulse interval without difficulty, so that the signal having double the period of the signal $S_{201}$ is provided.

FIG. 11 shows a still further embodiment, in which the pulse interval of the pulse transmitted as synchronization control signal is the same as the period of the clock pulse signal $S_{301}$. FIG. 12 shows waveforms involved in the operation of this embodiment. Signal $S_{304}$ is the received synchronization control signal, and it is combined with a signal $S_{302}$ in an adder 57. The signal $S_{302}$ is obtained by coupling a clock pulse signal $S_{301}$ to a 1/2 counter 56. The output signal $S_{305}$ of the adder 57 is shaped in a Schmitt circuit 58 to obtain a signal $S_{306}$, which is coupled through flip-flops 59 and 60. Signals $S_{307}$ and $S_{308}$ are produced from the respective flip-flops 59 and 60. The signal $S_{308}$ corresponds to the signal $S_{120}$ mentioned earlier in connection with FIG. 5. The waveforms of the signals $S_4$ and $S_{4A}$ shown in FIG. 12 are similar to those shown in FIG. 10.

As has been mentioned earlier, the selection of a suitable method of transmission of the synchronization control signal is very important in connection with the invention. In the preceding embodiments, the synchronization control signal is inserted within the picture signal in each scan line. In this method, to enable the separation of the synchronization control signal and picture signal on the reception side, they are either made distinct amplitude-wise at the time of transmission or transmitted as a mixture of AM and FM signals, or they are discriminated on a time division basis on the reception side. In either case, however, an intent to reduce adverse effects upon the signal-to-noise ratio regarding the picture signal would lead to the difficulty of separation of the synchronization control signal and picture signal, since the former signal is inserted within the latter signal.

This problem can be solved by the following two embodiments in which each of N divisions of one scan line is discriminated as to the quality of picture information or as to whether or not picture information is present to produce a processing synchronization control signal for one scan line. This signal is temporarily memorized in the transmission side, and on the basis of this signal the frequency conversion processing of the picture signal for the corresponding scan line is done for transmission. Also, methods for producing and processing the aforementioned control signal are shown below. Further, in these embodiments, the processing synchronization control signal for individual divisions in one scan line is transmitted as a group, and the control signal and picture signal are transmitted separately on a time division basis. Furthermore, the control signal is transmitted in a distinct predetermined period, so that it may be readily separated. Moreover, the length of the transmission can be freely selected, and the picture signal may also be transmitted freely without being troubled with the control signal.

One such embodiment will now be described with reference to FIGS. 13 to 16.

FIG. 13 shows the transmission side system of this embodiment, and FIG. 14 shows waveforms involved in the same. Reference numeral $S_{5A}$ represents a signal obtained by processing picture signal obtained by scanning. Usually, it has a binary form. Signal $S_{400}$, which is the basic clock pulse signal for this system, is frequency divided through counters 61 and 62 with a total frequency division factor of 1/128 into a clock pulse signal $S_{401}$. In this embodiment, 32 periods of the clock pulse signal $S_{401}$ constitute one scan line period. This signal $S_{401}$ is coupled through a flip-flop 63 and a counter 64 to produce a saw-tooth wave generation pulse signal $S_{408}$. In this embodiment, the quality of the picture signal is distinguished on the basis of the period of clock pulse signal for 33 periods for one scan line. Since the blanking period of the saw-tooth wave generation signal $S_{408}$ corresponds to one division of the scan line, one scan line actually consists of 32 divisions.

A flip-flop 66 is used as a circuit to determine whether or not picture information is present in each scan line division. The picture signal $S_{5A}$ is gated for one scan line through a gate circuit 65. The flip-flop 66 produces an output signal $S_{403}$ if a change in the picture signal is present in each scan line division, that is, if picture information is contained in each scan line division. The signal $S_{403}$ thus produced is used to set a flip-flop 67, which is reset at the end of the subsequent one period of the clock pulse signal $S_{401}$, thus producing a processing synchronization control signal $S_{404}$. This control signal $S_{404}$ indicates whether or not picture information is contained in each scan line division. It is transmitted to the reception side, and at the same time it is temporarily memorized in a shift register 68 on the transmission side. Similar to the transmission side, when the control signal $S_{404}$ is received on the reception side, it is temporarily memorized in a shift register, as will be described hereinafter. In this embodiment, while reading out the temporarily memorized control signal $S_{404}$, the processing of the picture signal for one scan line, that is, the frequency conversion and opposite frequency conversion is done both on the transmission and reception sides, thereby obtaining improved transmission efficiency. The shift pulse signal for the writing and reading of the control signal $S_{404}$ in and out of the shift register 68 is obtained by gating a signal $\overline{S}_{407}$ through a gate circuit 69 with the clock pulse signal $S_{401}$. The shift register 68 has an equal number of bits to the number of divisions of one scan line, i.e., 32 bits, so that the control signal $S_{404}$ for one scan line is written with the 32-bit pulse signal. The reading of the content of the shift register is started from the instant when the writing is ended with the same shift pulse signal. The shift register content is read out successively for the individual scan line divisions. In other words, the shift register 68 provides an output pulse for a scan line division every time a shift pulse is added to it. In this way, the control signal $S_{404}$ is read out of the shift register 68.

In the reading of the control signal $S_{404}$ from the shift register 68 in the above manner, as soon as an output pulse corresponding to a scan line division containing picture information is read out, a flip-flop 70 produces a signal $S_{406}$ having a pulse interval equal to one period of the clock pulse signal $S_{401}$. By the signal $S_{406}$ a gate circuit 73 is opened to permit the basic clock pulse signal $S_{400}$ for temporarily memorizing the picture signal $S_{5A}$ in a shift register 72. The shift register 72 has sufficient capacity to memorize the picture signal for one scan line division. For example, it has 128 bits or 258 bits.

Meanwhile, a flip-flop 71 is set from the falling edge of the signal $S_{406}$ and reset when 32 periods of the clock pulse signal $S_{401}$ have been counted from the falling edge of a signal $S_{410}$, which is produced as a flip-flop 75 is set by the falling edge of the signal $S_{406}$ and reset at the end of the subsequent one period of the clock pulse signal $S_{401}$. In this way, a signal $S_{407}$ is produced from the flip-flop 71. This signal $S_{407}$ is used to open a gate circuit 74 for permitting a clock pulse signal obtained by frequency dividing the basic clock pulse signal $S_{400}$ through a 1/32 counter 61. With the output pulses from the gate circuit 74, the temporarily memorized picture signal for one scan line division is read out of the shift register 72. Thus, the picture signal for one scan line division is elongated into a signal $S_{5B}$ having 32 times the length at the scanning time for transmission to the reception side. On the reception side, the picture signal $S_{5B}$ is oppositely frequency converted into the signal $S_{5A}$ for recording. If the output of the shift register 68 indicates that no picture information is present in the corresponding scan line division, no picture signal is transmitted. When a scan line division contains picture information, subsequent shift pulses are blocked by the gate circuit 69 off the shift register 68 for a period of the gate signal $\overline{S_{407}}$ equal to one scan line, to which period the picture signal is elongated through the frequency conversion. If no picture information is contained, a subsequent shift pulse is permitted through the gate circuit 69 for reading out the control signal corresponding to the next scan line division.

A NOR gate 77, flip-flops 78 and 79 and a NOR gate 80 constitute a circuit to produce a line synchronization control signal $S_{414}$. A signal $S_{407}$ and a saw-tooth wave generation signal $S_{408}$ are added to the NOR gate 77 to produce an output signal $S_{412}$, which in this case indicates that the reading and transmission of the picture signal for the previous scan line is ended and that the scanning is shifted to the next scan line. A flip-flop 78 produces a signal $S_{416}$ from the inverse of the control signal $S_{404}$ and the saw-tooth wave generation signal $S_{408}$. A flip-flop 79 produces a signal $S_{413}$ from signals $S_{412}$ and $\overline{S_{416}}$. The signal $S_{413}$ represents one scan line period when detecting line synchronization control signal for the scanning of a new line after the completion of the reading and transmission of the picture signal in the previous scan line. Thus, by adding this signal $S_{413}$ and the saw-tooth wave generation signal $S_{408}$ to a NOR gate 80, the line synchronization control signal $S_{414}$ is obtained from the NOR gate 80. The line synchronization control signal $S_{414}$ indicates that the reading and transmission of the picture signal in one scan line are completed, and it is used as auxiliary scan control pulse for driving a pulse motor. If no picture information is contained in any division in one scan line, the line synchronization control signal $S_{414}$ is produced at the period of the saw-tooth wave generation signal $S_{408}$. In this way, the scanning proceeds from one scan line to another until picture information is detected. A flip-flop 81 produces a pulse signal $S_{415}$ for phasing on the reception side from the saw-tooth wave generation signal $S_{408}$ and clock pulse signal $S_{401}$. The signal $S_{415}$ is delayed behind the saw-tooth wave generation signal $S_{408}$ for one period thereof. It is transmitted for one to several periods before transmission of the other signals for phasing on the reception side.

FIG. 15 shows the reception side system of this embodiment, and FIG. 16 shows waveforms involved in the same. In these FIGURES, signals of similar waveforms to those shown in FIGS. 13 and 14 are designated by like reference caracters with a prime. The reception side system of FIG. 15 is similar to the transmission side system of FIG. 13 except for that no circuit to discriminate whether or not picture information is present in each scan line division is provided on the input side of a shift register 68', that a flip-flop 82 is provided to produce a gate signal $S_{520}$ for the reading out of the picture signal temporarily memorized in a shift register 72', and that an inverter 83 is provided to produce an input signal to a flip-flop 78'. In the FIG. 15 system, the picture signal $S_{5B}$ temporarily memorized in a shift register 72' is read out from the instant of the end of its memorization under the control of the basic clock pulse signal $S_{400}'$ gated by the gate signal $S_{520}$. In other words, the opposite frequency convertion of the picture signal $S_{5B}$ into signal $S_{5A}$ is effected. The signal $S_{415}'$, which corresponds to the signal $S_{415}$ for phasing mentioned earlier in connection with FIG. 13, is used to reset a counter 64' before reception of picture signal and so forth for synchronizing the saw-tooth wave generation signal with respect to the transmission side.

FIGS. 17 to 20 show another embodiment, and they respectively correspond to FIGS. 13 to 16. This embodiment is different from the preceding embodiment of FIGS. 13 to 16 in the period of transmission of the processing synchronization control signal as a pulse group before processing one scan line. In the preceding FIGS. 13 to 16 embodiment this period is equal to one scan line period, while in the embodiment of FIGS. 17 to 20 it is extended to an integral multiple of one scan line period. The latter is advantageous in that the number N of the divisions in one scan line and the period of one scan line may be selected more freely.

Because of the extension of the period of the transmission of the processing synchronization control signal, the transmission and reception side systems of FIGS. 17 and 19 have somewhat complicated constructions compared to the respective systems of FIGS. 13 and 15, but the former systems are similar to the respective latter systems. In FIGS. 17 to 20, signals similar in function and waveform to those shown in FIGS. 13 to 16 are designated by like reference characters with three primes in FIGS. 17 and 18 and three primes in FIGS. 19 and 20.

The transmission side system of this embodiment will first be described in detail with reference to FIGS. 17 and 18. In this embodiment, the period of transmission of the processing synchronization control signal is extended to twice the period of one scan line. The picture signal $S_{6A}$, like the picture signal $S_{5A}$ mentioned earlier in connection with FIG. 13, is coupled to a shift register 72'' for the processing of the picture signal and to a shift register 68'' for the processing of the control signal. In the shift register 72'' the picture signal $S_{6A}$ is temporarily memorized under the control of the basic clock pulse signal $S_{400}''$ permitted through a gate circuit 73'' and read out through frequency conversion under the control of a clock pulse signal produced by coupling the basic clock pulse signal $S_{400}''$ to a 1/32 counter 61'' and permitted through a gate circuit 74'', similar to the mode of the FIG. 13 system. Meanwhile, similar to the mode of the FIG. 13 system, the processing synchronization control signal $S_{404}''$ for one scan line is temporarily memorized in the shift register 68'' under the control of the clock pulse signal $S_{401}''$ permitted through a gate circuit 85. In order to extend the period of transmission of the temporarily memorized processing synchronization control signal to twice the period of one scan line, it is read out under the control of a clock pulse signal produced by coupling the clock pulse signal $S''_{401}$ to a 1/2 counter 84 and permitted through a gate circuit 86 by a gate signal $S_{630}$ having a period corresponding to double the period of one scan line (as will be described hereinafter). In this way, the processing synchronization control signal is transmitted as signal $S_{635}$ having the extended period equal to double the period of one scan line.

At this time, if the content of the shift register 68'' disappears therefrom as it is read out, the subsequent synchronization control of writing and reading out of the picture signal in and out of the shift register 72'' becomes impossible. Therefore, the processing synchronization control signal $S_{635}$ obtained from the shift register 68'' is fed through an AND gate 87 and an OR gate 94 back to the register 68''. As soon as the transmission of the processing syncronization control signal $S_{635}$ is ended, the syncronization control of the writing and reading of the picture signal in and out of the shift register 72'' sets in. At this time, the reading of the processing syncronization control signal is done by a gate circuit 85. More particularly, the reading is effected under the control of the clock pulse signal $S_{401}''$ gated through the gate circuit 85 by a signal obtained by inverting a signal $S_{630}$ through an inverter 93. This mode of reading is similar to that in the FIG. 13 system. Also, the after-processing of the signal read out, that is, the signal permitted through a gate circuit 88, is similar to that in the FIG. 13 system.

OR gates 89 and 91 and flip-flops 90 and 92 constitute a circuit to determine the transmission period for the transmission of the processing synchronization control signal from the transmission side to the reception side. This circuit produces the gate signal $S_{630}$, with which the content of the shift register 68'' after the writing therein of the processing syncronization control signal $S_{404}''$ for one scan line immediately after the line synchronization control signal $S_{414}''$ is read out in subsequent two scan line periods, that is, in a period equal to double the period of one scan line. The gate signal $S_{630}$ also has such effect that from the instant of the end of the mentioned reading the content remaining in the shift register 68'' is again read out for the sake of syncronization control of the writing and reading of the picture signal in and out of the shift register 72''. If no information is contained in any division in one scan line, the inversion output $\overline{S_{416}}$ of the flip-flop 78'' is constant, and the next-stage flip-flop 79'' will not be reset thereby. In this way, the line syncronization control signal $S_{414}''$ is successively produced so long as no picture information appears. Further, the gate signal $S_{630}$ is adapted such that no signal without any picture information will be read out of the shift register 68'', thereby eliminating the otherwise possible wasteful time.

Now, the reception side system of this embodiment will be described with reference to FIGS. 19 and 20. The reception side system is mostly similar both in construction and mode of operation to the transmission side system of FIG. 17, so it will be described only briefly. In this system, during the transmission of the synchronization control signal a gate circuit 65''', is held open for writing this signal in a shift register 68''', and while reading out the content of this register a processing synchronization control signal for processing the subsequently transmitted picture signal. A flip-flop 82', like the flip-flop 82 in the FIG. 15 system, is peculier to the reception side, and it produces a gate signal $S_{520}''$ for reading the content of a shift register 72'''. The opposite frequency conversion of the picture signal $S_{6B}$ into signal $S_{64}$ in the shift register 72''' is similar to the one in the FIG. 15 system. Also, similar to the transmission side unless no picture information is contained in one scan line the auxiliary scanning of course proceeds to the next line.

FIG. 21 shows a sequence of various periods in the operation of the embodiment of FIGS. 17 to 20.

The waveform labeled $S_{701}$ represents saw-tooth wave used for the line scanning. The waveform labeled $S_{702}$ represents the line synchronization control pulse for the auxiliary scanning. The waveform labeled $S_{703}$ represents the period of temporarily memorizing the processing synchronization control signal for this scan line in the shift register 68'' on the transmission side. The waveform labeled $S_{704}$ represents the period of reading and transmission of the processing synchronization control signal. During this period, the transmitted processing synchronization control signal is temporarily memorized in the shift register 68''' on the reception side. The waveform labeled $S_{705}$ represents the period of transmission and processing of the picture signal. The waveform labeled $S_{706}$ represents the period of temporarily memorizing the picture signal in the shift register 72'' on the transmission side. The waveform labeled $S_{707}$ represents the period reading and transmitting the picture signal. During this period, the transmitted picture signal is temporarily memorized in the shift register 72'' on the reception side. The waveform labeled $S_{708}$ represents the period of reading the picture signal out of the shift register 72''' on the reception side and recording the signal on a recording medium.

FIG. 22 shows another sequence similar to that shown in FIG. 21. This sequence is different from the sequence of FIG. 21 in that the period of the saw-tooth wave $S_{801}$ is extended to an integral multiple of the normal period only when the line synchronization control signal is produced. In this operation mode, the period of the waveform $S_{703}$ in FIG. 21 may be omitted. In other words, the processing synchronization control signal is transmitted immediately when it is produced, and it may be simultaneously memorized temporarily on both transmission and reception sides. The periods of the waveforms $S_{801}$, $S_{802}$ and $S_{804}$ to $S_{807}$ respectively correspond to the periods of waveforms $S_{701}$, $S_{702}$ and $S_{704}$ to $S_{707}$ shown in FIG. 21.

The sequence of FIG. 21 (or FIG. 22) results when information to be recorded within the period for temporarily memorizing the processing synchronization control signal. If no information appears within the period of the waveform $S_{703}$ (or waveform $S_{803}$), the line synchronization control signal of the waveform $S_{702}$ (or waveform $S_{802}$) is produced immediately after the period of the waveform $S_{703}$ (or waveform $S_{803}$), thereby repeating the sequence of FIG. 21 (or FIG. 22).

The preceding embodiments have been based on dividing each scan line into a plurality of divisions.

FIGS. 23 to 26 show a still further embodiment, which is based on the division of the scan zone of the original into a plurality of small areas.

Prior to describing the construction and operation of this embodiment, discussion will first be made about the size of the division area in connection with FIG. 23.

To begin with, the area having the same information capacity as the information contained in one scan line division in the embodiment of FIGS. 1 to 6 will be calculated. Assuming the area division to be square, the length m of one side of such area is given as $$m = \frac{\sqrt{Pl}}{P} , \left( l = \frac{L}{n} \right)$$

where $L$ is the effective width of the original, $n$ is the number of the division areas, $P$ is the scan line density, and $l$ is the length of one scan line division.

In the embodiment of FIGS. 1 to 6, $n$ is equal to 32. The width L is equal to 218 mm if the original has the JIS B-6 size, and assuming a scan line density P of four lines/mm, the length $m$ of one side of the square is, from the above equation, is equal to 1 mm. This means that the information capacity of one scan line division having a length of 4 mm is equal to that of a square with an area of 1 $mm^2$ if the line scan density is four lines/mm. Thus, by dividing the scan zone of the original into a plurality of division areas each of 1 $mm^2$ and discriminating whether or not picture information is contained in each division area, the picture signal transmission efficiency may be improved with a similar signal processing to that in the embodiment of FIGS. 1 to 6. This is because with the usual original the number of scan area divisions without any picture information is usually greater than the number of scan line divisions without picture information if the area division and line division have the same information capacity, as has been mentioned earlier.

With this aspect in mind, the embodiment of FIGS. 24 to 26 will now be described.

FIG. 24 shows the transmission side of this embodiment, and FIG. 25 shows waveforms involved in the operation of the same.

The system of FIG. 24 is very similar to the system of FIG. 1, so like parts to those shown in FIG. 1 are designated by like reference characters with a prime and also like signals are indicated by like reference characters with two primes. More particularly, the system of FIG. 24 is different from the system of FIG. 1 only in that it additionally includes a saw-tooth wave generation circuit 101, flip-flops 102 and 103, a staircase wave generation circuit 104, an adder 105, a counter 32 and a separate saw-tooth wave generation circuit 107.

In operation, the saw-tooth wave generation circuit 106 produces a saw-tooth wave $S_{701}$ from a saw-tooth wave generation signal $S_6''$. The maximum amplitude of this saw-tooth wave $S_{701}$ is only one-fourth of the maximum amplitude of the saw-tooth wave in the FIG. 1 system. This is because the scanning of the division area of 1 $mm^2$ with the scanning spot takes the same time as for the scanning of a 4-mm scan line division in the FIG. 1 system, so that the speed of the scanning spot in the horizontal direction is one-fourth that in the system of FIG. 1 (the length $m$ of one side of the division area divided by the length $l$ of one scan line division). Thus, with the saw-tooth wave $S_{701}$ the scanning of the original is done for each one-fourth of the effective width of the original. The signal $S_8''$, which corresponds to the line scan signal $S_8$ mentioned earlier in connection with FIG. 1, is here produced at the end of processing of a picture signal in a certain scan section with the saw-tooth wave $S_{701}$, and plays the role of a staircase wave generation synchronization control signal for the scanning of the next scan section. The staircase wave generation synchronization control signal $S_8$ shown in FIG. 25 is produced in the case where picture information is contained in only one scan division area in the first scan section and not contained in the other scan division areas of that scan section. The flip-flops 102 and 103 act altogether as a quaternary counter, that is, the staircase wave generation circuit 104 produces a four-step staircase wave $S_{702}$ from the staircase wave generation synchronization control signal $S_8$. The saw-tooth wave $S_{701}$ and staircase wave $S_{702}$ are coupled to the adder 105 to obtain a signal $S_{703}$, which is impressed, for instance, on a horizontal deflection circuit in an electron tube. The line synchronization control signal $S_{704}$ is taken out for every four periods of the staircase wave generation synchronization control signal $S_8''$.

Meanwhile, the counter 106 frequency divides a clock pulse signal $S_{14}''$ by the factor of 1/32 for producing a saw-tooth wave $S_{706}$ in the saw-tooth wave generation circuit 107. The saw-tooth wave $S_{706}$ may be impressed on, for instance, a vertical deflection circuit of an electron tube.

In this way, the scanning spot scans each division area of 1 $mm^2$ with the line density of four lines/mm as shown in FIG. 23.

Here, the period of the saw-tooth wave $S_{706}$ is set equal to 1/32 of the period of the clock pulse signal $S_{14}$ (1/4 of the period of the clock pulse signal $S_1$). Thus, with the line density of four lines/mm the maximum picture frequency is the same as in the system of FIG. 1.

FIG. 26 shows the reception side of this embodiment. This system is the same as the system of FIG. 5 except for that a saw-tooth wave generation circuit 101', flip-flops 102' and 103', a digital-to-analog converter 104', an adder 105', a counter 106' and a saw-tooth wave generation circuit 107' are additionally provided. These additional parts have the same construction and function as the corresponding parts in the transmission side system of FIG. 24, so they are designated by like reference characters with two primes. Therefore, the construction and operation of the system of FIG. 26 will not be described any further.

While in the preceding embodiment of FIGS. 24 to 26 the signal processing is done for each division area by scanning each area with the scanning spot, this method is by no means limitative but only illustrative of the invention. For example, it is possible to use a method, in which the picture signal for a plurality of scan lines is temporarily memorized and subsequently read out and processed for each division area.

Also, while in the embodiment of FIGS. 1 to 6 the quantity of information in each division has been detected in terms of the two states of presence and absence of information, that is by no means limitative. For instance, according to the invention the quality or quantity of picture information contained in one division may be determined so as to accordingly vary the frequency conversion factor. If the detection is made as to whether or not the picture signal for one division is at a frequency above twice the maximum picture frequency, and if the frequency conversion factor is doubled if the picture signal is at a frequency above twice the maximum picture frequency, it is possible to obtain still better transmission efficiency.

What we claim is:

1. A facsimile system which comprises
scanning means to scan an original bearing picture information at one constant speed;
detecting means to detect the presence of a picture information signal from said scanning means during each scan for each one of a plurality of divisions of a scan zone;
memory means coupled to said scanning means for storing, at a high speed, the picture information signal obtained from said scanning means during each scan for one said division;
means coupled to said detecting means and to said memory means to read out, at a low speed lower than said high speed, the picture information signal stored in said memory means when a picture information signal is detected and an output signal is provided by said detecting means;
means coupled to said detecting means for producing a synchronizing control signal when said detecting means detects a picture information signal, said synchronizing control signal representing that a picture information signal is contained in the scan zone division being scanned;
further detecting means for detecting the outputs of said read-out and synchronizing signal means; and
means coupled to said further detecting means for reproducing original picture information from the output of said further detecting means as a function of the detected synchronizing control signal.

2. The facsimile system as claimed in claim 1, wherein said scan zone is one scan line.

3. A method of transmitting a facsimile signal through bandwidth compression comprising the steps of:
scanning an original bearing picture information at one constant speed;
detecting a picture information signal contained in a scanned zone;
generating a control signal representing the presence of a picture information signal in a scanned division of a scan zone;
transmitting said control signal to a receiving station, and at the same time storing said control signal;
storing said picture information signal at a high speed;
reading out the stored control signal; and
reading out the stored picture information signal at a low speed lower than said high speed and transmitting the picture information signal, in response to the reading out of said stored control signal, after transmitting the control signal to the receiving station.

4. The method of transmitting a facsimile signal through bandwidth compression as claimed in claim 3, wherein the time for reading out said stored control signal is equal to an integral multiple of the time for storing said control signal.

5. A method for transmitting a facsimile signal through bandwidth compression comprising the steps of:
scanning an original bearing picture information at one constant speed;
detecting the presence of a picture information signal during each scan for each one of a plurality of divisions of a scan zone; storing, at a high speed, the picture information signal obtained during each scan for one said division;
producing a synchronization control signal when the picture information signal has been detected, said synchronization control signal representing that a picture information signal is contained in the scan zone division being scanned;
transmitting the synchronization control signal to a receiving station;
reading out, at a low speed lower than said high speed, the stored picture information signal after said picture signal information has been detected during a scan of said division; and
transmitting the read-out picture signal to said receiving station.

6. The method of transmitting a facsimile signal through bandwidth compression as claimed in claim 5, wherein said scan zone is one scan line.

7. A facsimile system which comprises:
scanning means to scan an original bearing picture information at one constant speed;
detecting means to detect the presence of a picture information signal from said scanning means during each scan for each one of a plurality of divisions of a scan zone;
memory means coupled to said scanning means for storing, at a high speed, the picture information signal obtained from said scanning means during each scan for one said division;
means coupled to said detecting means and to said memory means to read out, at a low speed lower than said high speed, the picture information signal stored in said memory means when a picture information signal is detected and an output signal is provided by said detecting means;
means coupled to said detecting means for producing a synchronizing control signal representing that a picture information signal is contained in the scan zone division being scanned;
further detecting means for detecting the outputs of said read-out and synchronizing signal means;
means coupled to said further detecting means for reproducing original picture information from the output of said further detecting means as a function of the detected synchronizing control signal;
said synchronizing signal means includes means for establishing the pulse width of said synchronizing control signal;
said read-out means includes means for establishing the read-out period of the picture signal information stored in said memory means; and
said scanning means includes means for establishing a horizontal scanning period for said scan, wherein the horizontal scan period is substantially equal to an integral multiple of the sum of said pulse width of the synchronizing control signal and said read-out period.

8. A facsimile system which comprises:

scanning means to scan an original bearing picture information at one constant speed;

detecting means to detect the presence of a picture information signal from said scanning means during each scan for each one of a plurality of divisions of a scan zone;

memory means coupled to said scanning means for storing, at a high speed, the picture information signal obtained from said scanning means during each scan for one said division;

means coupled to said detecting means and to said memory means to read out, at a low speed lower than said high speed, the picture information signal stored in said memory means when a picture information signal is detected and an output signal is provided by said detecting means;

means coupled to said detecting means for producing a synchronizing control signal when said detecting means detects a picture information signal, said synchronizing control signal representing that a picture information signal is contained in the scan zone division being scanned;

further detecting means for detecting the outputs of said read-out and synchronizing signal means;

means coupled to said further detecting means for reproducing original picture information from the output of said further detecting means as a function of the detected synchronizing control signal;

wherein the further detecting means for detecting the picture and synchronization control signals comprises means to generate a clock pulse signal with a predetermined constant frequency, adding means to add said clock pulse signal to said synchronization control signal, and means to shape the output of the adding means, whereby a synchronization control signal synchronized with said clock pulse is detected.

* * * * *